US012676711B2

(12) United States Patent
Su et al.

(10) Patent No.: US 12,676,711 B2
(45) Date of Patent: Jul. 7, 2026

(54) NETWORK DEVICES, TERMINAL DEVICES, AND METHODS THEREIN

(71) Applicant: Telefonaktiebolaget LM Ericsson (publ), Stockholm (SE)

(72) Inventors: Ling Su, Beijing (CN); Zhipeng Lin, Nanjing Jiangsu (CN); Yuande Tan, Beijing (CN); Robert Mark Harrison, Grapevine, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 338 days.

(21) Appl. No.: 18/260,999

(22) PCT Filed: Jan. 14, 2022

(86) PCT No.: PCT/SE2022/050039
§ 371 (c)(1),
(2) Date: Jul. 11, 2023

(87) PCT Pub. No.: WO2022/154738
PCT Pub. Date: Jul. 21, 2022

(65) Prior Publication Data
US 2025/0286673 A1     Sep. 11, 2025

(30) Foreign Application Priority Data
Jan. 15, 2021    (WO) ................ PCT/CN2021/072288

(51) Int. Cl.
*H04L 5/00*           (2006.01)

(52) U.S. Cl.
CPC .......... *H04L 5/0044* (2013.01); *H04L 5/0094* (2013.01)

(58) Field of Classification Search
None
See application file for complete search history.

(56) References Cited

U.S. PATENT DOCUMENTS

| | | | | |
|---|---|---|---|---|
| 2021/0314973 A1* | 10/2021 | Liu | ........................ | H04L 5/0053 |
| 2022/0131652 A1* | 4/2022 | Bae | ........................ | H04L 1/1864 |
| 2023/0007641 A1* | 1/2023 | Kim | .................... | H04W 72/044 |
| 2023/0189217 A1* | 6/2023 | Wang | ................ | H04W 72/0446 |
| | | | | 370/329 |
| 2023/0239846 A1* | 7/2023 | Sun | ........................ | H04L 5/0007 |

OTHER PUBLICATIONS

International Search Report and Written Opinion dated Apr. 20, 2022 for International Application No. PCT/SE2022/050039 filed Jan. 14, 2022, consisting of 10-pages.
(Continued)

*Primary Examiner* — Brandon M Renner
(74) *Attorney, Agent, or Firm* — Weisberg I.P. Law, P.A.

(57)           ABSTRACT

The present disclosure provides a method in a network device. The method includes: determining a configuration for a terminal device to transmit a Transmission Block, TB, the configuration indicating at least a transmission mode in which a single TB is allowed to be transmitted over more than one slot; transmitting the configuration to the terminal device; and receiving the TB that is transmitted from the terminal device according to the configuration.

16 Claims, 10 Drawing Sheets

(56) References Cited

OTHER PUBLICATIONS

3GPP TSG RAN WG1 Meeting #88 R1-1703868; Title: WF on grant-free repetitions; Agenda Item: 8.1.3.4.3; Source: Huawei, HiSilicon, Nokia, ABS, ZTE, ZTE Microelectronics, CATT, Convida Wireless, CATR, OPPO, Inter Digital, Fujitsu; Date and Location: Feb. 13-17, 2017, Athens, Greece, consisting of 2-pages.

3GPP TSG RAN WG1 Meeting #88bis R1-1705067; Title: Scheduling scheme for slot aggregation; Agenda Item: 8.1.3.3.2; Source: Huawei, HiSilicon; Document for: Discussion and decision; Date and Location: Apr. 3-7, 2017, Spokane, USA, consisting of 7-pages.

3GPP TSG RAN WG1#103-e R1-2008092; Title: Potential solutions for PUSCH coverage enhancement; Agenda Item: 8.8.2.1; Source: Spreadtrum Communications; Document for: Discussion and decision; Date and Location: Oct. 26-Nov. 13, 2020, e-Meeting, consisting of 5-pages.

3GPP TSG RAN WG1 #103-e R1-2008729; Title: Discussion on potential techniques for PUSCH coverage enhancement; Agenda Item: 8.8.2.1; Source: WILUS Inc.; Document for: Discussion/ Decision; Date and Location: Oct. 26-Nov. 13, 2020, e-Meeting, consisting of 6-pages.

Japanese Office Action and English translation dated Oct. 1, 2024 for Application No. 2023-542865, consisting of 7 pages.

3GPP TSG RAN WG1 #103-e R1-2007680; Title: Discussion on solutions for PUSCH coverage enhancement; Source: vivo; Agenda Item: 8.8.2.1; Document for: Discussion and Decision; Location and Date: Meeting, Oct. 26-Nov. 13, 2020, consisting of 9 pages.

3GPP TSG RAN WG1 Meeting 90bis R1-1718216; Title: DL/UL resource allocation; Source: NTT DOCOMO, Inc.; Agenda Item: 7.3.3.1; Document for: Discussion and Decision; Location and Date: Prague, CZ, Oct. 9-13, 2017, consisting of 9 pages.

3GPP TSG RAN WG1 Meeting 91 R1-1719973; Title: Resource allocation for PDSCH/PUSCH; Source: OPPO; Agenda Item: 7.3.3.1; Document for: Discussion and Decision; Location and Date: Reno, USA, Nov. 27th-Dec. 1, 2017, consisting of 10 pages.

* cited by examiner s210

200 obtaining a  configuration for transmitting
a TB from a network device s220 determining resource for transmitting the TB according to the
configuration s230 transmitting the TB on the determined resources

NETWORK DEVICE
300

400

TERMINAL DEVICE
500

600

NETWORK DEVICES, TERMINAL DEVICES, AND METHODS THEREIN

CROSS-REFERENCE TO RELATED APPLICATIONS

This application is a Submission Under 35 U.S.C. § 371 for U.S. National Stage Patent Application of International Application No.: PCT/SE2022/050039, filed Jan. 14, 2022 entitled "NETWORK DEVICES, TERMINAL DEVICES, AND METHODS THEREIN," which claims priority to Chinese Application No.: PCT/CN2021/072288, filed Jan. 15, 2021, the entireties of both of which are incorporated herein by reference.

TECHNICAL FIELD

The present disclosure relates to wireless communication, and more particularly, to network devices, terminal devices and methods therein for transmission block transmission across multiple slots.

BACKGROUND

In NR Rel-15 and 16, the transport block (TB) size is determined by Resource

Element (RE) resources with a number of Physical Resource Blocks (PRBs) and a number of no more than 14 OFDM symbols, i.e. no more than a slot in time domain. To reach certain UL data rate, usually multiple PRBs in a slot are allocated for a TB transmission.

However, increasing resources in frequency domain will make a lower power density of the signals transmitted on each OFDM symbol, thus making the channel estimation accuracy worse, given that the UE has the limitation of the total power. So the option to improve the performance of a PUSCH transmission is to increase resources in time domain, e.g. repetition in time domain.

Furthermore, on top of increase time domain resource, to reduce the overhead of Cyclic Redundancy Check (CRC) and reduce the coding rate, the Transport Block Size (TBS) of a Physical Uplink Shared Data Channel (PUSCH) transmission can be determined according to multiple slots, and different versions of encoded samples can be mapped to different slots for the PUSCH transmission across the multiple slots.

SUMMARY

It is an object of the present disclosure to provide network devices, terminal devices and methods therein, enabling TB transmission over multiple slots.

According to a first aspect of the present disclosure, a method in a network device is provided. The method may include: determining a configuration for a terminal device to transmit a Transmission Block, TB, the configuration indicating at least a transmission mode in which a single TB is allowed to be transmitted over more than one slot; transmitting the configuration to the terminal device; and receiving the TB that is transmitted from the terminal device according to the configuration.

In an embodiment, the configuration indicates a type A TB over Multiple Slots (TBoMS) transmission, and wherein symbols at a same position in each of a number of slots are configured for transmitting the TB.

In an embodiment, the configuration contains parameters S, L, and N when the type A TBoMS transmission is indicated in the configuration, where S indicates a starting symbol relative to a start of a first slot, L indicates a number of contiguous symbols in each slot, and N indicates a number of slots.

In an embodiment, a group of N slots starting from the first slot is used by the terminal device in transmitting the TB, each slot of the group having at least L contiguous available symbols starting from a symbol indicated by S, and L contiguous available symbols starting from a symbol indicated by S in each slot of the group are used by the terminal device in transmitting the TB.

In an embodiment, the configuration further contains a parameter X1 indicating a minimum number of contiguous available symbols starting from a symbol indicated by S in each slot, and wherein available symbols in any slot previous to the last slot of the group, which is not included in the group and has no less than X1 contiguous available symbols starting from a symbol indicated by S, are used by the terminal device in transmitting the TB.

In an embodiment, available symbols starting from a symbol indicated by S in any slot previous to the last slot of the group, which is not included in the group and has no less than X1 contiguous available symbols, are symbol-wise repetition of symbols in a particular slot of the group.

In an embodiment, the configuration indicates a type B TBoMS transmission, and wherein a number of symbols across more than one slot are configured for transmitting the TB.

In an embodiment, the type B TBoMS transmission comprises at least one of a slot-based type B TBoMS transmission and a symbol-based type B TBoMS transmission.

In an embodiment, the configuration contains parameters S and N when the slot-based type B TBoMS transmission is indicated in the configuration, where S indicates a starting symbol relative to a start of a first slot, and N indicates a number of slots.

In an embodiment, the configuration contains parameters S and L when the symbol-based type B TBoMS transmission is indicated in the configuration, where S indicates a starting symbol relative to a start of a first slot, and L indicates a number of symbols.

In an embodiment, the configuration further indicates a frequency hopping supported, including one or more of:
intra-slot frequency hopping,
inter-slot frequency hopping, or
inter-bundle frequency hopping.

In an embodiment, the slot used in transmitting the TB forms a predefined number of bundles and each bundle uses a same frequency hopping.

In an embodiment, the configuration further indicates whether the frequency hopping applies for any of the slot used in transmitting the TB with less than a predetermined number of contiguous available symbols.

In an embodiment, if the configuration indicates that a frequency hopping is disabled, the terminal device uses the same set of Physical Resource Blocks (PRBs) across the N slots, and if the configuration indicates that a frequency hopping is enabled, the number of PRBs is the same across the N slots.

In an embodiment, the parameter N is indicated with one or more of the following:
N is signaled by a new Downlink Control Information, DCI, field;
N is added to a Time Domain Resource Assignment, TDRA, table and jointly encoded with TDRA field in DCI; or
N is Radio Resource Control, RRC, configured.

In an embodiment, transmission of the TB is scheduled with dynamic grant or configured grant.

In an embodiment, when a dynamic SFI is not configured, whether semi-static flexible symbols in any slot configured for transmitting the TB are available symbols is RRC/DCI configured or predetermined.

In an embodiment, the configuration further contains a parameter X1 indicating a minimum number of contiguous available symbols in each slot, and wherein available symbols of any slot among K−1 slots following the first slot, which slot having less than X1 contiguous available symbols, are not used by the terminal device in transmitting the TB.

In an embodiment, a group of N slots starting from the first slot is used by the terminal device in transmitting the TB, each slot of the group other than the first slot having at least 14 available symbols.

In an embodiment, the configuration further contains a parameter X1 indicating a minimum number of contiguous available symbols in each slot, and wherein a group of N slots starting from the first slot is used by the terminal device in transmitting the TB, each slot of the group other than the first slot having no less than X1 contiguous available symbols.

In an embodiment, available symbols of L symbols starting from the symbol indicated by S are used by the terminal device in transmitting the TB.

In an embodiment, the configuration further contains a parameter X1 indicating a minimum number of available symbols in each slot, and any slot covered by the L symbols with less than X1 available symbols is not used in transmitting the TB.

In an embodiment, L available symbols starting from the symbol indicated by S are used by the terminal device in transmitting the TB.

In an embodiment, the configuration further contains a parameter X1 indicating a minimum number of available symbols in each slot, and any slot covered by the L available symbols with less than X1 available symbols is not counted for the L available symbols and not used in transmitting the TB.

In an embodiment, available symbols in the slot after the first slot, which slot is not used in transmitting the TB are symbol-wise repetition of symbols in a particular slot used in transmitting the TB.

In an embodiment, the configuration further contains a Physical Uplink Shared Data Channel, PUSCH, mapping type.

In an embodiment, the PUSCH mapping type comprises at least PUSCH mapping type A and PUSCH mapping type B, and the PUSCH mapping type A or the PUSCH mapping type B is configured for the type A TBoMS transmission.

In an embodiment, the terminal device uses the PUSCH mapping type B for any slot having less than L contiguous available symbols used in transmitting the TB when the type A TBoMS transmission is indicated in the configuration.

In an embodiment, the terminal device uses the PUSCH mapping type A for transmitting the TB when the type A TBoMS transmission is indicated in the configuration and any slot used in transmitting the TB has at least four available symbols, wherein a Demodulation Reference Signal, DMRS, position in each slot is defined relative to a parameter S defined in the PUSCH mapping type A.

In an embodiment, the terminal device uses the PUSCH mapping type A for any slot having less than four contiguous available symbols used in transmitting the TB when the type A TBoMS transmission is indicated in the configuration and N slots starting from the first slot are used in transmitting the TB regardless of whether any slot of the N slots has L available symbols or not, and the terminal device uses a separately configured DMRS configuration.

In an embodiment, the PUSCH mapping type B is configured for the type B TBoMS transmission, and a Demodulation Reference Signal, DMRS, position in each slot depends on the number of contiguous available symbols in the slot.

In an embodiment, the parameter L defined in the PUSCH mapping type B for a symbol-based Type B TBoMS transmission is larger than 14 for normal Cyclic Prefix, CP, or 12 for extended CP.

In an embodiment, when a dynamic Slot Format Indication, SFI, is configured and the transmission of the TB is scheduled with dynamic grant, dynamic downlink symbols in any slot configured for transmitting the TB are regarded as unavailable symbols.

In an embodiment, when a dynamic SFI is configured and the transmission of the TB is scheduled with configured grant, whether semi-static flexible symbols in any slot configured for transmitting the TB are available symbols is RRC/DCI configured or predetermined.

In an embodiment, a single Cyclic Redundancy Check, CRC, is transmitted for the TB.

According to a second aspect of the present disclosure, a network device is provided. The terminal device may include a transceiver, a processor and a memory. The memory contains instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a terminal device is provided. The method may include: obtaining a configuration for transmitting a Transmission Block, TB, from a network device, the configuration indicating at least a transmission mode in which a single TB is allowed to be transmitted over more than one slot; determining resources for transmitting the TB according to the configuration; and transmitting the TB to the network device over the determined resources.

In an embodiment, the configuration indicates a type A TB over Multiple Slots (TBoMS) transmission, and wherein symbols at a same position in each of a number of slots are configured for transmitting the TB.

In an embodiment, the configuration contains parameters S, L, and N when the type A TBoMS transmission is indicated in the configuration, where S indicates a starting symbol relative to a start of a slot, L indicates a number of contiguous symbols in each slot, and N indicates a number of slots.

In an embodiment, a group of N slots starting from the first slot is used by the terminal device in transmitting the TB, each slot of the group having at least L contiguous available symbols starting from a symbol indicated by S, and L contiguous available symbols starting from a symbol indicated by S in each slot of the group are used by the terminal device in transmitting the TB.

In an embodiment, the configuration further contains a parameter X1 indicating a minimum number of contiguous available symbols starting from a symbol indicated by S in each slot, and wherein available symbols in any slot previous to the last slot of the group, which is not included in the group and has no less than X1 contiguous available symbols starting from a symbol indicated by S, are used by the terminal device in transmitting the TB.

In an embodiment, available symbols starting from a symbol indicated by S in any slot previous to the last slot of the group, which is not included in the group and has no less than X1 contiguous available symbols, are symbol-wise repetition of symbols in a particular slot of the group.

In an embodiment, the configuration indicates a type B TBoMS transmission, and wherein a number of symbols across more than one slot are configured for transmitting the TB.

In an embodiment, the type B TBoMS transmission comprises at least one of a slot-based type B TBoMS transmission and a symbol-based type B TBoMS transmission.

In an embodiment, the configuration contains parameters S and N when the slot-based type B TBoMS transmission is indicated in the configuration, where S indicates a starting symbol relative to a start of a first slot, and N indicates a number of slots.

In an embodiment, the configuration contains parameters S and L when the symbol-based type B TBoMS transmission is indicated in the configuration, where S indicates a starting symbol relative to a start of a first slot, and L indicates a number of symbols.

In an embodiment, the configuration further indicates a frequency hopping supported, including one or more of:

intra-slot frequency hopping, inter-slot frequency hopping, or inter-bundle frequency hopping.

In an embodiment, the slot used in transmitting the TB forms a predefined number of bundles and each bundle uses a same frequency hopping.

In an embodiment, the configuration further indicates whether the frequency hopping applies for any of the slot used in transmitting the TB with less than a predetermined number of contiguous available symbols.

In an embodiment, if the configuration indicates that a frequency hopping is disabled, the terminal device uses the same set of Physical Resource Blocks (PRBs) across the N slots, and if the configuration indicates that a frequency hopping is enabled, the number of PRBs is the same across the N slots.

In an embodiment, the parameter N is indicated with one or more of the following:

N is signaled by a new Downlink Control Information, DCI, field;

N is added to a Time Domain Resource Assignment, TDRA, table and jointly encoded with TDRA field in DCI; or N is Radio Resource Control, RRC, configured.

In an embodiment, transmission of the TB is scheduled with dynamic grant or configured grant.

In an embodiment, when a dynamic SFI is configured and the transmission of the TB is scheduled with configured grant, whether semi-static flexible symbols in any slot configured for transmitting the TB are available symbols is RRC/DCI configured or predetermined.

In an embodiment, the configuration further contains a parameter X1 indicating a minimum number of contiguous available symbols in each slot, and wherein available symbols of any slot among K−1 slots following the first slot, which slot having less than X1 contiguous available symbols, are not used by the terminal device in transmitting the TB.

In an embodiment, a group of N slots starting from the first slot is used by the terminal device in transmitting the TB, each slot of the group other than the first slot having at least 14 available symbols.

In an embodiment, the configuration further contains a parameter X1 indicating a minimum number of contiguous available symbols in each slot, and wherein a group of N slots starting from the first slot is used by the terminal device in transmitting the TB, each slot of the group other than the first slot having no less than X1 contiguous available symbols.

In an embodiment, available symbols of L symbols starting from the symbol indicated by S are used by the terminal device in transmitting the TB.

In an embodiment, the configuration further contains a parameter X1 indicating a minimum number of available symbols in each slot, and any slot covered by the L symbols with less than X1 available symbols is not used in transmitting the TB.

In an embodiment, L available symbols starting from the symbol indicated by S are used by the terminal device in transmitting the TB.

In an embodiment, the configuration further contains a parameter X1 indicating a minimum number of available symbols in each slot, and any slot covered by the L available symbols with less than X1 available symbols is not counted for the L available symbols and not used in transmitting the TB.

In an embodiment, available symbols in the slot after the first slot, which slot is not used in transmitting the TB are symbol-wise repetition of symbols in a particular slot used in transmitting the TB.

In an embodiment, the configuration further contains a Physical Uplink Shared Data Channel, PUSCH, mapping type.

In an embodiment, the PUSCH mapping type comprises at least PUSCH mapping type A and PUSCH mapping type B, and the PUSCH mapping type A or the PUSCH mapping type B is configured for the type A TBoMS transmission.

In an embodiment, the terminal device uses the PUSCH mapping type B for any slot having less than L contiguous available symbols used in transmitting the TB when the type A TBoMS transmission is indicated in the configuration.

In an embodiment, the terminal device uses the PUSCH mapping type A for transmitting the TB when the type A TBoMS transmission is indicated in the configuration and any slot used in transmitting the TB has at least four available symbols, wherein a Demodulation Reference Signal, DMRS, position in each slot is defined relative to a parameter S defined in the PUSCH mapping type A.

In an embodiment, the terminal device uses the PUSCH mapping type A for any slot having less than four contiguous available symbols used in transmitting the TB when the type A TBoMS transmission is indicated in the configuration and N slots starting from the first slot are used in transmitting the TB regardless of whether any slot of the N slots has L available symbols or not, and the terminal device uses a separately configured DMRS configuration.

In an embodiment, the PUSCH mapping type B is configured for the type B TBoMS transmission, and a Demodulation Reference Signal, DMRS, position in each slot depends on the number of contiguous available symbols in the slot.

In an embodiment, the parameter L defined in the PUSCH mapping type B for a symbol-based Type B TBoMS transmission is larger than 14 for normal Cyclic Prefix, CP, or 12 for extended CP.

In an embodiment, when a dynamic Slot Format Indication, SFI, is configured and the transmission of the TB is scheduled with dynamic grant, dynamic downlink symbols in any slot configured for transmitting the TB are regarded as unavailable symbols.

In an embodiment, when a dynamic SFI is not configured, whether semi-static flexible symbols in any slot configured for transmitting the TB are available symbols is RRC/DCI configured or predetermined.

In an embodiment, a single Cyclic Redundancy Check, CRC, is transmitted for the TB.

According to a fifth aspect of the present disclosure, a terminal device is provided. The terminal device may include a transceiver, a processor and a memory. The memory contains instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the embodiments of the present disclosure, a single TB may be transmitted over multiple slots. The performance of a PUSCH transmission thus is enhanced.

BRIEF DESCRIPTION OF THE DRAWINGS

The above and other objects, features and advantages will be more apparent from the following description of embodiments with reference to the figures, in which.

DETAILED DESCRIPTION

Figure 1:
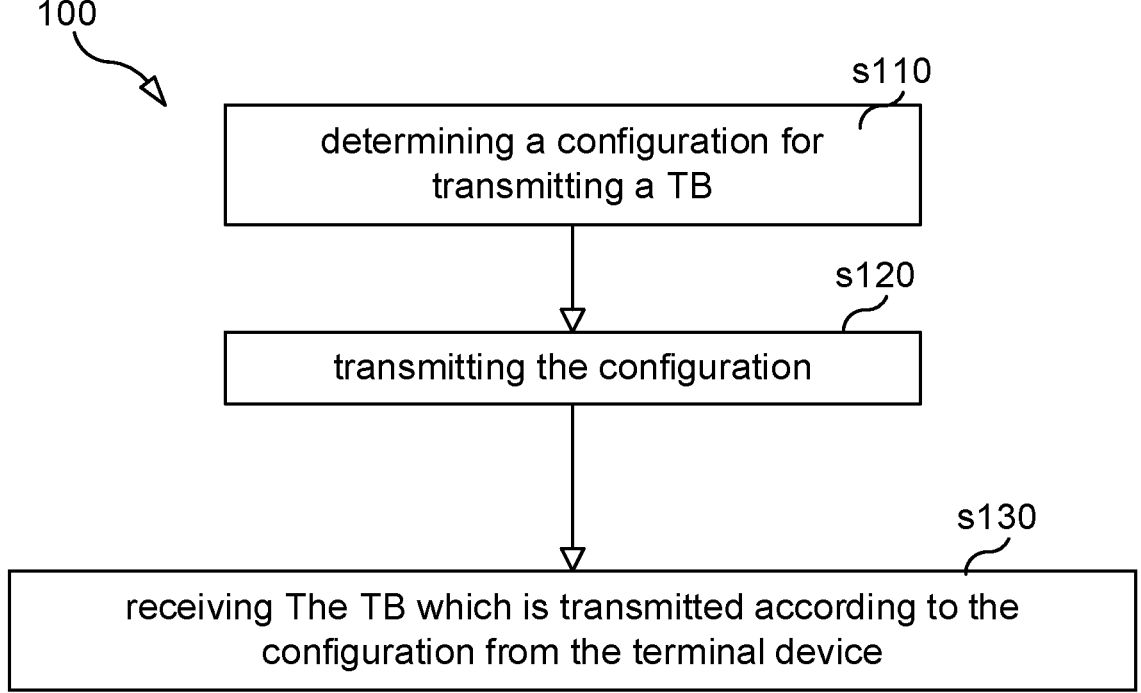
FIG. 1 is a flowchart illustrating a method in a network device according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VOIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

1.1 PUSCH Repetition in NR Rel-15 and Rel-16

1.1.1 NR Rel-15

Slot aggregation for Physical Downlink Shared Data Channel, PUSCH, is supported in Rel-15 and renamed to PUSCH Repetition Type A in Rel-16. The name "PUSCH repetition Type A" is used even if there is only a single repetition, i.e. no slot aggregation. In Rel. 15, a PUSCH transmission that overlaps with downlink, DL, symbols is not transmitted.

For DCI granted multi-slot transmission (PDSCH/PUSCH) vs semi-static DL/UL assignment If semi-static DL/UL assignment configuration of a slot has no direction confliction with scheduled PDSCH/PUSCH assigned symbols, the PDSCH/PUSCH in that slot is received/transmitted If semi-static DL/UL assignment configuration of a slot has direction confliction with scheduled PDSCH/PUSCH assigned symbols, the PDSCH/PUSCH transmission in that slot is not received/transmitted, i.e. the effective number of repetitions reduces In Rel. 15, the number of repetitions is semi-statically configured by RRC parameter pusch-AggregationFactor. At most 8 repetitions are supported.

| pusch-AggregationFactor | ENUMERATED { n2, n4, n8 } |
| --- | --- |

1.1.2 NR Rel-16

A new repetition format PUSCH repetition Type B is supported in Rel-16, which PUSCH repetition allows back-to-back repetition of PUSCH transmissions. The biggest difference between the two types is that PUSCH repetition Type A only allows a single repetition in each slot, with each repetition occupying the symbols at the same position. Using this format with a PUSCH length shorter than 14 introduces gaps between repetitions, increasing the overall latency. The other change compared to Rel. 15 is how the number of repetitions is signalled. In Rel. 15, the number of repetitions is semi-statically configured, while in Rel. 16 the number of repetitions can be indicated dynamically in DCI. This applies both to dynamic grants and configured grants type 2.

In NR R16, invalid symbols for PUSCH repetition Type B include reserved uplink, UL, resources. The invalid symbol pattern indicator field is configured in the scheduling DCI. Segmentation occurs around symbols that are indicated as DL by the semi-static TDD pattern and invalid symbols.

If dynamic indication of TDD pattern through DCI format 2_0 (i.e., SFI) is configured, the segmentation behaviour is different for dynamic grants and configured grants.

For dynamic grants, the UE only looks at the scheduling DCI and segments around semi-static DL symbols and reserved symbols as indicated by the pattern.

For configured grant, the segmentation is based on semi-static DL symbols and the pattern for reserved resources, but some actual repetitions are dropped based on reception of the SFI. If the UE receives an SFI, it drops any actual repetitions that overlap with dynamically indicated DL or flexible symbols. If the UE does not receive an SFI that covers an actual repetition, the UE drops the repetition if any of the symbols in it are semi-static flexible symbols.

The signaling of number of repetitions is shown below.

From 3GPP TS 38.214 V16.2.0:

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberofrepetitions is present in the resource allocation table, the number of repetitions K is equal to numberofrepetitions;

elseif the UE is configured with pusch-Aggregation-Factor, the number of repetitions K is equal to pusch-AggregationFactor;

otherwise K=1.

Format DCI0_1 in 3GPP TS 38.212 V16.1.0:

Time domain resource assignment-0, 1, 2, 3, 4, 5, or 6 bits

If the higher layer parameter USCH-TimeDomainResourceAllocationList-ForDCIformat0_1 is not configured and if the higher layer parameter pusch-TimeDo-mainAllocationList is configured, 0, 1, 2, 3, or 4 bits as defined in Clause 6.1.2.1 of 3GPP TS 38.214. The bitwidth for this field is determined as $\lceil \log_2(I) \rceil$ bits, where I is the number of entries in the higher layer parameter pusch-TimeDomainAllocationList or pusch-TimeDomainAllocationList-r16, If the higher layer parameter PUSCH-TimeDomainRe-sourceAllocationList-ForDCIformat0_1 is configured, 0, 1, 2, 3, 4, 5 or 6 bits as defined in Clause 6.1.2.1 of 3GPP TS 38.214. The bitwidth for this field is deter-mined as $\lceil \log_2(I) \rceil$ bits, where I is the number of entries in the higher layer parameter PUSCH-TimeDomainRe-sourceAllocationList-ForDCIformat0_1;

otherwise the bitwidth for this field is determined as $\lceil \log_2(I) \rceil$ bits, where I is the number of entries in the default table.

From 3GPP TS 38.331 V16.1.0

| PUSCH-Config information element | |
| --- | --- |
| pusch-TimeDomainAllocationList TimeDomainResourceAllocationList } | SetupRelease { PUSCH- |
| pusch-AggregationFactor | ENUMERATED { n2, n4, n8 } |
| | OPTIONAL, -- Need S |
| pusch-TimeDomainAllocationListForDCI-Format0-1-r16 SetupRelease { PUSCH-TimeDomainResourceAllocationList-r16 } | |
| pusch-TimeDomainAllocationListForDCI-Format0-2-r16 SetupRelease { PUSCH-TimeDomainResourceAllocationList-r16 } | |

PUSCH-TimeDomainResourceAllocation information element

```
-- ASN1START
-- TAG-PUSCH-TIMEDOMAINRESOURCEALLOCATIONLIST-START
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::= SEQUENCE {
    k2                          INTEGER(0..32)              OPTIONAL,
-- Need S
    mappingType                 ENUMERATED {typeA, typeB},
    startSymbolAndLength        INTEGER (0..127)
}
PUSCH-TimeDomainResourceAllocationList-r16 ::= SEQUENCE (SIZE(1..maxNrofUL-Allocations-
r16)) OF PUSCH-TimeDomainResourceAllocation-r16
PUSCH-TimeDomainResourceAllocation-r16 ::= SEQUENCE {
    k2-r16                      INTEGER(0..32)      OPTIONAL,   -- Need S
    puschAllocationList-r16             SEQUENCE (SIZE(1..maxNrofMultiplePUSCHs-r16))
OF PUSCH-Allocation-r16,
    ...
}
PUSCH-Allocation-r16 ::= SEQUENCE {
    mappingType-r16                     ENUMERATED {typeA, typeB}
OPTIONAL,   -- Cond NotFormat01-02-Or-TypeA
    startSymbolAndLength-r16            INTEGER (0..127)
OPTIONAL,   -- Cond NotFormat01-02-Or-TypeA
    startSymbol-r16                     INTEGER (0..13)
OPTIONAL,   -- Cond RepTypeB
    length-r16                  INTEGER (1..14)             OPTIONAL,
-- Cond RepTypeB
    numberOfRepetitions-r16             ENUMERATED {n1, n2, n3, n4, n7, n8, n12, n16}
OPTIONAL,   -- Cond Format01-02
    ...
}
-- TAG-PUSCH-TIMEDOMAINRESOURCEALLOCATIONLIST-STOP
-- ASN1STOP
maxNrofUL-Allocations        INTEGER ::= 16          -- Maximum number of PUSCH time
domain resoure allocations.
maxNrofUL-Allocations-r16    INTEGER ::= 64          -- Maximum number of PUSCH time
domain resoure allocations
```

1.2 TDRA

For the PUSCH transmission, the time domain resource allocation (TDRA) is determined by $K_2$, the start symbol S, the number of consecutive symbols L and the mapping type. $K_2$ indicates which slot is used for PUSCH transmission. S indicates the starting symbols for the PUSCH transmission in the scheduling slot and L indicates the length of consecutive symbols for PUSCH transmission. The mapping type indicates different S and L combinations for PUSCH.

Specifically, UE shall transmit the PUSCH in the slot $$\left\lfloor n \frac{2^{uPUSCH}}{2^{uPDCCH}} \right\rfloor + K_2 \right\rfloor,$$

where n is the slot with the scheduling DCI, $u_{PUSCH}$ and $u_{PDCCH}$ are the subcarrier spacing configurations for PUSCH and PDCCH. There are two ways to express S and L. In the first way, S and L are expressed separately. In the second way, S and L are combined using the following equations and expressed by SLIV.

| If (L − 1) ≤ 7 then | SLIV = 14(L − 1) + S |
|---|---|
| Else | SLIV = 14(14 − L + 1) + (14 − 1 − S) | where 0<L≤14−S. The mapping type rule is shown in the following table.

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} for repetition Type A, {1, . . . , 23} for repetition Type B |

1.2.1 the Method of Indicating Parameters in TDRA

There are three cases for scheduling PUSCH transmission, including UL grant in a DCI, configured grant Type 1 and configured Type 2. They use different ways to indicate parameters in TDRA.

A group of parameters indicates the value of $K_2$, SLIV and mapping type at the same time, and groups of parameters compose the TDRA list in the RRC signaling or the default PUSCH TDRA Table. Then Time domain resource assignment in DCI field or timeDomainAllocation in RRC indicates the index of the TDRA list or the row of default PUSCH TDRA Table.

1) When the PUSCH transmission(s) is scheduled by an UL grant in a DCI, UE determines which PUSCH TDRA configuration is used based on RNTI and PDCCH search space. The following table shows the relationship between them.

TABLE 6.1.2.1.1-1

| | | Applicable PUSCH time domain resource allocation | | |
|---|---|---|---|---|
| RNTI | PDCCH search space | pusch-ConfigCommon includes pusch-TimeDomainAllocationList | pusch-Config includes pusch-TimeDomainAllocationList | PUSCH time domain resource allocation to apply |
| PUSCH scheduled by MAC RAR as described in clause 8.2 of [6, TS 38.213] | | No Yes | — | Default A pusch-TimeDomainAllocationList provided in pusch-ConfigCommon |
| C-RNTI, MCS-C-RNTI, TC-RNTI, CS-RNTI | Any common search space associated with CORESET 0 | No Yes | — | Default A pusch-AlloTimeDomaincationList provided in pusch-ConfigCommon |
| C-RNTI, MCS-C-RNTI, TC-RNTI, | Any common search space not associated with | No Yes | No No | Default A pusch-TimeDomainAllocationList provided in pusch-ConfigCommon |

TABLE 6.1.2.1.1-1-continued

| | | Applicable PUSCH time domain resource allocation | | |
|---|---|---|---|---|
| RNTI | PDCCH search space | pusch-ConfigCommon includes pusch-TimeDomainAllocationList | pusch-Config includes pusch-TimeDomainAllocationList | PUSCH time domain resource allocation to apply |
| CS-RNTI, SP-CSI-RNTI | CORESET 0, UE specific search space | No/Yes | Yes | pusch-TimeDomainAllocationList provided in pusch-Config |

1.1) If the default A is applied, the TDRA list is shown in following tables for normal CP and extended CP.

TABLE 6.1.2.1.1-2

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 6.1.2.1.1-3

Default PUSCH time domain resource allocation A for extended CP

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |

TABLE 6.1.2.1.1-3-continued

Default PUSCH time domain resource allocation A for extended CP

| Row index | PUSCH mapping type | $K_2$ | S | L |
|---|---|---|---|---|
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 | where j is determined by the numerology of the PUSCH as shown in the following table.

TABLE 6.1.2.1.1-4

Definition of value j

| $\mu_{PUSCH}$ | j |
|---|---|
| 0 | 1 |
| 1 | 1 |
| 2 | 2 |
| 3 | 3 |

In the default Table A for normal CP and extended CP, there are 16 rows indicating different TDRA parameters. If the PUSCH is scheduled by DCI format 0_0, the time domain resource assignment (including 4 bits) value m in the DCI field indicates the row index m+1 of the default table. If the PUSCH is scheduled by DCI format 0_1 and the higher layer parameter is not configured, the time domain resource assignment (including 4 bits) value m in the DCI field indicates the row index m+1 of the default table.

1.2) If pusch-configCommon is applied, it contains pusch-TimeDomainAllocationList as shown in the following.

```
-- ASN1START
-- TAG-PUSCH-CONFIGCOMMON-START
PUSCH-ConfigCommon ::=                        SEQUENCE {
    groupHoppingEnabledTransformPrecoding         ENUMERATED {enabled}
OPTIONAL,    -- Need R
    pusch-TimeDomainAllocationList                PUSCH-TimeDomainResourceAllocationList
OPTIONAL,    -- Need R
    msg3-DeltaPreamble                            INTEGER (−1..6)
OPTIONAL,    -- Need R
    p0-NominalWithGrant                           INTEGER (−202..24)
OPTIONAL,    -- Need R
    ...
}
-- TAG-PUSCH-CONFIGCOMMON-STOP
-- ASN1STOP
```

The pusch-TimeDomainAllocationList contains groups TDRA parameters as shown in the following.

```
-- ASN1START
-- TAG-PUSCH-TIMEDOMAINRESOURCEALLOCATIONLIST-START
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::= SEQUENCE {
   k2                         INTEGER(0..32)          OPTIONAL,   -- Need S
   mappingType                ENUMERATED {typeA, typeB},
   startSymbolAndLength       INTEGER (0..127)
}
-- TAG-PUSCH-TIMEDOMAINRESOURCEALLOCATIONLIST-STOP
-- ASN1STOP
```

Then the value of Time domain resource assignment field [15] in DCI 0_1 indicates the element in the list, value 0 refers to the first element in the list, value 1 refers to the second element in the list and so on.

1.3) If pusch-config is applied, it contains pusch-Time-DomainAllocationList as shown in the following.

```
-- ASN1START
-- TAG-PUSCH-CONFIG-START
PUSCH-Config ::=                            SEQUENCE {
   dataScramblingIdentityPUSCH                 INTEGER (0..1023)
OPTIONAL,   -- Need S
   txConfig                                 ENUMERATED {codebook, nonCodebook}
OPTIONAL,   -- Need S
   dmrs-UplinkForPUSCH-MappingTypeA            SetupRelease { DMRS-UplinkConfig }
OPTIONAL,   -- Need M
   dmrs-UplinkForPUSCH-MappingTypeB            SetupRelease { DMRS-UplinkConfig }
OPTIONAL,   -- Need M
   pusch-PowerControl                          PUSCH-PowerControl
OPTIONAL,   -- Need M
   frequencyHopping                         ENUMERATED {intraSlot, interSlot}
OPTIONAL,   -- Need S
   frequencyHoppingOffsetLists                 SEQUENCE (SIZE (1..4)) OF INTEGER (1..
maxNrofPhysicalResourceBlocks-1)
OPTIONAL,   -- Need M
   resourceAllocation                       ENUMERATED { resourceAllocationType0,
resourceAllocationType1, dynamicSwitch},
   pusch-TimeDomainAllocationList              SetupRelease { PUSCH-
TimeDomainResourceAllocationList }           OPTIONAL,   -- Need M
   pusch-AggregationFactor                  ENUMERATED { n2, n4, n8 }
OPTIONAL,   -- Need S
   mcs-Table                                ENUMERATED {qam256, qam64LowSE}
OPTIONAL,   -- Need S
   mcs-TableTransformPrecoder                  ENUMERATED {qam256, qam64LowSE}
OPTIONAL,   -- Need S
   transformPrecoder                           ENUMERATED {enabled, disabled}
OPTIONAL,   -- Need S
   codebookSubset                              ENUMERATED {fullyAndPartialAndNonCoherent,
partialAndNonCoherent, nonCoherent}
OPTIONAL, -- Cond codebookBased
   maxRank                                  INTEGER (1..4)
OPTIONAL, -- Cond codebookBased
   rbg-Size                                 ENUMERATED { config2}
OPTIONAL, -- Need S
   uci-OnPUSCH                                 SetupRelease { UCI-OnPUSCH}
OPTIONAL, -- Need M
   tp-pi2BPSK                                  ENUMERATED {enabled}
OPTIONAL, -- Need S
   ...
}
UCI-OnPUSCH ::=                             SEQUENCE {
   betaOffsets                                 CHOICE {
      dynamic                                     SEQUENCE (SIZE (4)) OF BetaOffsets,
      semiStatic                                  BetaOffsets
   }
OPTIONAL, -- Need M
   scaling                                  ENUMERATED { f0p5, f0p65, f0p8, f1 }
}
-- TAG-PUSCH-CONFIG-STOP
-- ASN1STOP
```

The pusch-TimeDomainAllocationList contains groups TDRA parameters as shown in the following.

```
-- ASN1START
-- TAG-PUSCH-TIMEDOMAINRESOURCEALLOCATIONLIST-START
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::= SEQUENCE {
    k2                          INTEGER(0..32)          OPTIONAL,   -- Need S
    mappingType                 ENUMERATED {typeA, typeB},
    startSymbolAndLength        INTEGER (0..127)
}
-- TAG-PUSCH-TIMEDOMAINRESOURCEALLOCATIONLIST-STOP
-- ASN1STOP
```

Then the value of Time domain resource assignment field in DCI 0_1 indicates the element in the list, value 0 refers to the first element in the list, value 1 refers to the second element in the list and so on.

2) When the PUSCH transmission(s) is scheduled by configured grant type 1, the selection of default Table A or pusch-TimeDomainAllocationList provided by pusch-Con-figCommon or pusch-TimeDomainAllocationList provided by pusch-Config follows the rules for the UE specific search space in Table 6.1.2.1.1-1. And the timeDomainAllocation in configuredGrantConfig provides the value m indicating the index m+1 for the default Table A or pusch-TimeDomainAllocationList.

```
-- ASN1START
-- TAG-CONFIGUREDGRANTCONFIG-START
ConfiguredGrantConfig ::=            SEQUENCE {
    frequencyHopping                    ENUMERATED {intraSlot, interSlot}
OPTIONAL,    -- Need S
    cg-DMRS-Configuration               DMRS-UplinkConfig,
    mcs-Table                           ENUMERATED {qam256, qam64LowSE}
OPTIONAL,    -- Need S
    mcs-TableTransformPrecoder          ENUMERATED {qam256, qam64LowSE}
OPTIONAL,    -- Need S
    uci-OnPUSCH                         SetupRelease { CG-UCI-OnPUSCH }
OPTIONAL,    -- Need M
    resourceAllocation                  ENUMERATED { resourceAllocationType0,
resourceAllocationType1, dynamicSwitch },
    rbg-Size                            ENUMERATED {config2}
OPTIONAL,    -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}
OPTIONAL,    -- Need S
    nrofHARQ-Processes                  INTEGER(1..16),
    repK                                ENUMERATED {n1, n2, n4, n8},
    repK-RV                             ENUMERATED {s1-0231, s2-0303, s3-0000}
OPTIONAL,    -- Need R
    periodicity                         ENUMERATED {
                                            sym2, sym7, sym1x14, sym2x14, sym4x14,
sym8x14, sym10x14, sym16x14, sym20x14,
                                            sym32x14, sym40x14, sym64x14, sym80x14, sym128x14,
sym160x14, sym256x14, sym320x14, sym512x14,
                                            sym640x14, sym1024x14, sym1280x14, sym2560x14,
sym5120x14,
                                            sym6, sym1x12, sym2x12, sym4x12, sym5x12, sym8x12,
sym10x12, sym16x12, sym20x12, sym32x12,
                                            sym40x12, sym64x12, sym80x12, sym128x12,
sym160x12, sym256x12, sym320x12, sym512x12, sym640x12,
                                            sym1280x12, sym2560x12
                                        },
    configuredGrantTimer                INTEGER (1..64)
OPTIONAL,    -- Need R
    rrc-ConfiguredUplinkGrant           SEQUENCE {
        timeDomainOffset                    INTEGER (0..5119),
        timeDomainAllocation                INTEGER (0..15),
        frequencyDomainAllocation           BIT STRING (SIZE(18)),
        antennaPort                         INTEGER (0..31),
        dmrs-SeqInitialization              INTEGER (0..1)
OPTIONAL,    -- Need R
        precodingAndNumberOfLayers          INTEGER (0..63),
        srs-ResourceIndicator               INTEGER (0..15)
OPTIONAL,    --Need R
        mcsAndTBS                           INTEGER (0..31),
        frequencyHoppingOffset              INTEGER (1.. maxNrofPhysicalResourceBlocks-1)
OPTIONAL,    -- Need R
```

-continued

```
      pathlossReferenceIndex                  INTEGER (0..maxNrofPUSCH-PathlossReferenceRSs-
1),
      ...
   }
OPTIONAL,   -- Need R
   ...
}
CG-UCI-OnPUSCH ::= CHOICE {
   dynamic                        SEQUENCE (SIZE (1..4)) OF BetaOffsets,
   semiStatic                     BetaOffsets
}
-- TAG-CONFIGUREDGRANTCONFIG-STOP
-- ASN1STOP
```

3) When the PUSCH transmission(s) is scheduled by configured grant type 2, the resource allocation follows the higher layer configuration according to 3GPP TS 38.321, and UL grant received on the DCI.

1.2.2 PUSCH Repetition Type A

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberofrepetitions is present in the resource allocation table, the number of repetitions K is equal to numberofrepetitions;

elseif the UE is configured with pusch-AggregationFactor, the number of repetitions K is equal to pusch-AggregationFactor, otherwise K=1.

For PUSCH repetition Type A, in case K>1, the same symbol allocation is applied across the K consecutive slots and the PUSCH is limited to a single transmission layer. The UE shall repeat the TB across the K consecutive slots applying the same symbol allocation in each slot.

DM-RS positions for intra-slot frequency hopping

From 3GPP TS 38.211 V16.0.0

FIG. 1 is a flowchart illustrating a method 100 according to an embodiment of the present disclosure. The method 100 can be performed at a network device, e.g., a gNB.

At step s110, the network device determines a configuration for a terminal device to transmit a TB. The configuration indicating at least a transmission mode in which a single TB is allowed to be transmitted over more than one slot.

At step s120, the network device transmits the configuration to the terminal device.

Then at step s130, the network device receives the TB that is transmitted from the terminal device according to the configuration.

In an embodiment, the configuration indicates a type A multi-slot TB transmission. In the type A TBoMS transmission, symbols at a same position in each of a number of slots are configured for transmitting the TB.

In an embodiment, the configuration indicates a type B multi-slot TB transmission. In the type B TBoMS transmission, a number of symbols across more than one slot are configured for transmitting the TB.

TABLE 6.4.1.1.3-6

PUSCH DM-RS positions $\bar{l}$ within a slot for single-symbol DM-RS and intra-slot frequency hopping enabled.

| | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

2. TBoMs Configuration

Hereinafter, the term "TBoMS" represents "TB over multiple slots" or "TB processing over multiple slots." The expression a slot "covered" by a number of symbols or slots refers to a slot that is deemed as an unavailable slot in counting the symbols or slots and thus bypassed in counting, but is in the range from the first symbols to the last symbols of the number of symbols or from the first slot to the last slot of the number of slots.

In an embodiment, the type B TBoMS transmission comprises at least one of a slot-based type B TBoMS transmission and a symbol-based type B TBoMS transmission.

The network device configures the terminal device with the transmission mode for transmitting the TB. For example, the terminal device may be configured with a type A TBoMS transmission, a slot-based type B TBoMS transmission, or a symbol-based type B TBoMS transmission.

In an embodiment, the configuration contains parameters S, L, and N when the type A TBoMS transmission is indicated in the configuration, where S indicates a starting symbol relative to a start of a slot, L indicates a number of contiguous symbols in each slot, and N indicates a number of slots.

In an embodiment, the configuration contains parameters S and N when the slot-based type B TBoMS transmission is indicated in the configuration, where S indicates a starting symbol relative to a start of a first slot, and N indicates a number of slots.

In an embodiment, the configuration contains parameters S and L when the symbol-based type B TBoMS transmission is indicated in the configuration, where S indicates a starting symbol relative to a start of a first slot, and L indicates a number of symbols.

The network device configures the terminal device with the resource allocation, for example the parameters used in the TBoMS transmission.

In an embodiment, available symbols of the configured symbols are used by the terminal device in transmitting the TB. That is, in case that a slot-based type B TBoMS transmission or a Type A multi-slot transmission is configured by the network device, the terminal device drops any unavailable symbols and uses available symbols of the configured symbols in transmitting the TB.

In an embodiment, the configuration further contains a parameter X1 indicating a minimum number of contiguous available symbols starting from a symbol indicated by S in each slot, and wherein any slot among N slots starting from the first slot, which slot having less than X1 contiguous available symbols starting from a symbol indicated by S, is not used by the terminal device in transmitting the TB. That is, in case that a type A TBoMS transmission is configured by the network device, the terminal device counts N slots from the first slot, where any slot among the N slots having less than X1 contiguous available symbols starting from a symbol indicated by S is deemed as an unavailable slot. Available slots among the N slots are used by the terminal device in transmitting the TB. In this case, at most N slots are used by the terminal device in transmitting the TB.

In an embodiment, the configuration further contains a parameter X1 indicating a minimum number of contiguous available symbols in each slot, and wherein any slot among N−1 slots following the first slot, which slot having less than X1 contiguous available symbols, is not used by the terminal device in transmitting the TB. That is, in case that a slot-based type B TBoMS transmission is configured by the network device, the terminal device counts N slots from the first slot, where any slot other than the first slot among the N slots having less than X1 contiguous available symbols starting from a symbol indicated by S is deemed as an unavailable slot. The available symbols of available slots among the N slots are used by the terminal device in transmitting the TB.

In an embodiment, a group of N slots starting from the first slot is used by the terminal device in transmitting the TB, each slot of group having at least L contiguous available symbols starting from a symbol indicated by S. In that case, L contiguous available symbols starting from a symbol indicated by S in each slot of the group are used by the terminal device in transmitting the TB. That is, in case that a type A TBoMS transmission is configured by the network device, the terminal device counts N slots from the first slot, where any slot having less than L contiguous symbols starting from a symbol indicated by S is not counted in counting the N slots. The counted N slots are used by the terminal device in transmitting the TB. In particular, L contiguous available symbols starting from a symbol indicated by S in each slot of the counted N slots are used by the terminal device in transmitting the TB.

In an embodiment, the configuration further contains a parameter X1 indicating a minimum number of contiguous available symbols starting from a symbol indicated by S in each slot, and wherein available symbols in any slot previous to the last slot of the group, which is not included in the group and has no less than X1 contiguous available symbols starting from a symbol indicated by S, are used by the terminal device in transmitting the TB. That is, in case that a type A TBoMS transmission is configured by the network device, the terminal device counts N slots from the first slot, where any slot having less than X1 contiguous available symbols starting from a symbol indicated by S is not counted in counting the N slots. The counted N slots are used by the terminal device in transmitting the TB. In particular, the terminal device uses L contiguous available symbols starting from a symbol indicated by S in a slot among the counted K slots, if the slot has at least L contiguous available symbols starting from a symbol indicated by S, and all the contiguous available symbols starting from a symbol indicated by S in a slot among the counted K slots, if the slot has no more than L contiguous available symbols starting from a symbol indicated by S.

In an embodiment, a group of N slots starting from the first slot is used by the terminal device in transmitting the TB, each slot of the group other than the first slot having at least 14 available symbols. That is, in case that a slot-based type B TBoMS transmission is configured by the network device, the terminal device counts N slots from the first slot, where any slot other than the first slot having less than 14 available symbols is not counted in counting the N slots. The available symbols of the counted N slots are used by the terminal device in transmitting the TB.

In an embodiment, the configuration further contains a parameter X1 indicating a minimum number of contiguous available symbols in each slot, and wherein a group of N slots starting from the first slot is used by the terminal device in transmitting the TB, each slot of the group other than the first slot having no less than X1 contiguous available symbols. That is, in case that a slot-based type B TBoMS transmission is configured by the network device, the terminal device counts N slots from the first slot, where any slot other than the first slot having less than X1 contiguous available symbols is not counted in counting the N slots.

The available symbols of the counted N slots are used by the terminal device in transmitting the TB.

In an embodiment, available symbols starting from a symbol indicated by S in any slot previous to the last slot of the group, which slot is not included in the group and has no less than X1 contiguous available symbols, are symbol-wise repetition of symbols in a particular slot of the group. That is, in case that a slot-based type B TBoMS transmission or a type A multi-slot transmission is configured by the network device, the slot that is deemed as an unavailable slot in counting the N slots carries symbol repetition of symbols of a particular slot of the N counted slots.

In an embodiment, available symbols of L symbols starting from the symbol indicated by S are used by the terminal device in transmitting the TB. That is, in case that a symbol-based type B TBoMS transmission is configured by the network device and a parameter L is configured, the terminal device counts L symbols from the first symbol indicated by S, and uses available symbols among the L symbols in transmitting the TB.

In an embodiment, L available symbols starting from the symbol indicated by S are used by the terminal device in transmitting the TB. That is, in case that a symbol-based Type B TBoMS transmission is configured by the network device and a parameter L is configured, the terminal device counts L available symbols from the symbol indicated by S and uses the counted L available symbol in transmitting the TB.

In an embodiment, the configuration further contains a parameter X1 indicating a minimum number of available symbols in each slot, and any slot covered by the L symbols with less than X1 available symbols is not used in transmitting the TB. That is, in case that a symbol-based type B TBoMS transmission is configured by the network device and a parameter L is configured, the terminal device counts L symbols from the first symbol indicated by S, any slot with less than X1 available symbols covered by the L symbols is deemed as an unavailable slot and symbols of the unavailable slot are not used in transmitting the TB. In this case, the terminal device uses at most L symbols in transmit the TB.

In an embodiment, the configuration further contains a parameter X1 indicating a minimum number of available symbols in each slot, and any slot covered by the L available symbols with less than X1 available symbols is not counted for the L available symbols and not used in transmitting the TB. That is, in case that a symbol-based Type B TBoMS transmission is configured by the network device and a parameter L is configured, the terminal device counts L available symbols from the symbol indicated by S, any slot with less than X1 available symbols is not counted in counting the available symbols and deemed as an unavailable slot. That is, symbols of the unavailable slot is not counted in counting the L available symbols and not used in transmitting the TB. The terminal device uses the counted L available symbols in transmitting the TB.

In an embodiment, available symbols in the slot after the first slot, which slot is not used in transmitting the TB are symbol-wise repetition of symbols in a particular slot used in transmitting the TB. That is, in case that a symbol-based type B TBoMS transmission is configured by the network device, the slot that is not used in transmitting the TB carries symbol repetition of symbols of a particular slot used in transmitting the TB.

In an embodiment, the configuration further contains a Physical Uplink Shared Data Channel, PUSCH, mapping type.

In an embodiment, the PUSCH mapping type comprises at least PUSCH mapping type A and PUSCH mapping type B, and the PUSCH mapping type A or the PUSCH mapping type B is configured for the type A TBoMS transmission.

In an embodiment, the terminal device uses the PUSCH mapping type B for any slot having less than L contiguous available symbols used in transmitting the TB when the type A TBoMS transmission is indicated in the configuration.

In an embodiment, the terminal device uses the PUSCH mapping type A for transmitting the TB when the type A TBoMS transmission is indicated in the configuration and any slot used in transmitting the TB has at least four available symbols, wherein a Demodulation Reference Signal, DMRS, position in each slot is defined relative to a parameter S defined in the PUSCH mapping type A.

In an embodiment, the terminal device uses the PUSCH mapping type A for any slot having less than four contiguous available symbols used in transmitting the TB when the type A TBoMS transmission is indicated in the configuration and N slots starting from the first slot are used in transmitting the TB regardless of whether any slot among the N slots has L available symbols or not, and the terminal device uses a separately configured DMRS configuration.

In an embodiment, the PUSCH mapping type B is configured for the type B TBoMS transmission, and a Demodulation Reference Signal, DMRS, position in each slot depends on the number of contiguous available symbols in the slot.

In an embodiment, the parameter L defined in the PUSCH mapping type B for a symbol-based Type B TBoMS transmission is larger than 14 for normal Cyclic Prefix, CP, or 12 for extended CP.

In an embodiment, the configuration further indicates a frequency hopping supported, including one or more of:
    intra-slot frequency hopping,
    inter-slot frequency hopping, or
    inter-bundle frequency hopping.

In an embodiment, the slot used in transmitting the TB forms a predefined number of bundles and each bundle uses a same frequency hopping.

In an embodiment, the configuration further indicates whether the frequency hopping applies for any of the slot used in transmitting the TB with less than a predetermined number of contiguous available symbols.

In an embodiment, if the configuration indicates that a frequency hopping is disabled, the terminal device uses the same set of Physical Resource Blocks (PRBs) across the N slots, and if the configuration indicates that a frequency hopping is enabled, the number of PRBs is the same across the N slots.

In an embodiment, in case that a type A TBoMS transmission or a slot-based type B TBoMS transmission is configured by the network device, the parameter N is indicated with one or more of the following:
    N is signaled by a new Downlink Control Information, DCI, field;
    N is added to a Time Domain Resource Assignment, TDRA, table and jointly encoded with TDRA field in DCI; or
    N is Radio Resource Control, RRC, configured.

In an embodiment, transmission of the TB is scheduled with dynamic grant or configured grant.

In an embodiment, when a dynamic Slot Format Indication, SFI, is configured and the transmission of the TB is scheduled with dynamic grant, dynamic downlink symbols in any slot configured for transmitting the TB are regarded as unavailable symbols.

In an embodiment, when a dynamic SFI is configured and the transmission of the TB is scheduled with configured grant, whether semi-static flexible symbols in any slot configured for transmitting the TB are available symbols is RRC/DCI configured or predetermined.

In an embodiment, when a dynamic SFI is not configured, whether semi-static flexible symbols in any slot configured for transmitting the TB are available symbols is RRC/DCI configured or predetermined.

In an embodiment, a single Cyclic Redundancy Check, CRC, is transmitted for the TB.

Figure 2:
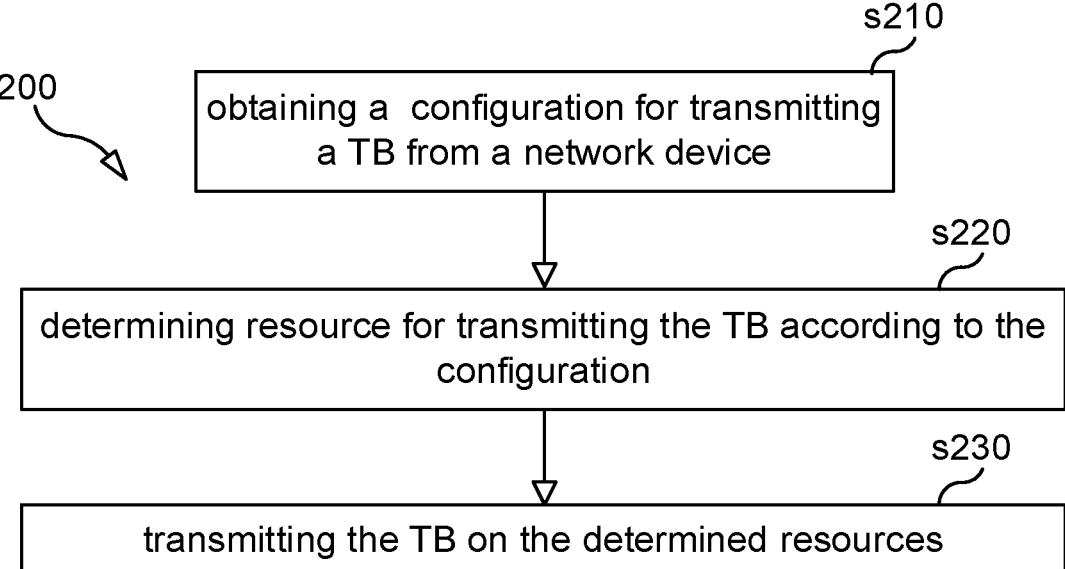
FIG. 2 is a flowchart illustrating a method in a terminal device according to an embodiment of the present disclosure.

FIG. 2 is a flowchart illustrating a method 200 according to an embodiment of the present disclosure. The method 200 can be performed in a terminal device, e.g., a UE.

At step s210, the terminal device obtains a configuration for transmitting a TB from a network device. The configuration indicates at least a transmission mode in which a single TB is allowed to be transmitted over more than one slot.

The terminal device then determines resources for transmitting the TB according to the configuration at step s220, and transmits the TB to the network device over the determined resources at step s230.

In an embodiment, the configuration indicates a type A TBoMS transmission. In the type A TBoMS transmission, symbols at a same position in each of a number of slots are configured for transmitting the TB.

In an embodiment, the configuration indicates a type B TBoMS transmission. In the type B TBoMS transmission, a number of symbols across more than one slot are configured for transmitting the TB.

In an embodiment, the type B TBoMS transmission comprises at least one of a slot-based type B TBoMS transmission and a symbol-based type B TBoMS transmission.

The network device configures the terminal device with the transmission mode for transmitting the TB. For example, the terminal device may be configured with a type A TBoMS transmission, a slot-based type B TBoMS transmission, or a symbol-based type B TBoMS transmission.

In an embodiment, the configuration contains parameters S, L, and N when the type A TBoMS transmission is indicated in the configuration, where S indicates a starting symbol relative to a start of a slot, L indicates a number of contiguous symbols in each slot, and N indicates a number of slots.

In an embodiment, the configuration contains parameters S and N when the slot-based type B TBoMS transmission is indicated in the configuration, where S indicates a starting symbol relative to a start of a first slot, and N indicates a number of slots.

In an embodiment, the configuration contains parameters S and L when the symbol-based type B TBoMS transmission is indicated in the configuration, where S indicates a starting symbol relative to a start of a first slot, and L indicates a number of symbols.

The network device configures the terminal device with the resource allocation, for example the parameters used in the TBoMS transmission.

In an embodiment, available symbols of the configured symbols are used by the terminal device in transmitting the TB. That is, in case that a slot-based type B TBoMS transmission or a Type A multi-slot transmission is configured by the network device, the terminal device drops any unavailable symbols and uses available symbols of the configured symbols in transmitting the TB.

In an embodiment, the configuration further contains a parameter X1 indicating a minimum number of contiguous available symbols starting from a symbol indicated by S in each slot, and wherein any slot among N slots starting from the first slot, which slot having less than X1 contiguous available symbols starting from a symbol indicated by S, is not used by the terminal device in transmitting the TB. That is, in case that a type A TBoMS transmission is configured by the network device, the terminal device counts N slots from the first slot, where any slot among the N slots having less than X1 contiguous available symbols starting from a symbol indicated by S is deemed as an unavailable slot. Available slots among the N slots are used by the terminal device in transmitting the TB. In this case, at most N slots are used by the terminal device in transmitting the TB.

In an embodiment, the configuration further contains a parameter X1 indicating a minimum number of contiguous available symbols in each slot, and wherein any slot among N−1 slots following the first slot, which slot having less than X1 contiguous available symbols, is not used by the terminal device in transmitting the TB. That is, in case that a slot-based type B TBoMS transmission is configured by the network device, the terminal device counts N slots from the first slot, where any slot other than the first slot among the N slots having less than X1 contiguous available symbols is deemed as an unavailable slot. The available symbols of available slots among the N slots are used by the terminal device in transmitting the TB.

In an embodiment, a group of N slots starting from the first slot is used by the terminal device in transmitting the TB, each slot of the group having at least L contiguous available symbols starting from a symbol indicated by S. In that case, L contiguous available symbols starting from a symbol indicated by S in each slot of the group are used by the terminal device in transmitting the TB. That is, in case that a type A TBoMS transmission is configured by the network device, the terminal device counts N slots from the first slot, where any slot having less than L contiguous symbols starting from a symbol indicated by S is not counted in counting the N slots. The counted N slots are used by the terminal device in transmitting the TB. In particular, L contiguous available symbols starting from a symbol indicated by S in each slot of the counted N slots are used by the terminal device in transmitting the TB.

In an embodiment, the configuration further contains a parameter X1 indicating a minimum number of contiguous available symbols starting from a symbol indicated by S in each slot, and wherein available symbols in any slot previous to the last slot of the group, which is not included in the group and has no less than X1 contiguous available symbols starting from a symbol indicated by S, are used by the terminal device in transmitting the TB. That is, in case that a type A TBoMS transmission is configured by the network device, the terminal device counts N slots from the first slot, where any slot having less than X1 contiguous available symbols starting from a symbol indicated by S is not counted in counting the N slots. The counted N slots are used by the terminal device in transmitting the TB. In particular, the terminal device uses L contiguous available symbols starting from a symbol indicated by S in a slot among the counted K slots, if the slot has at least L contiguous available symbols starting from a symbol indicated by S, and all the contiguous available symbols starting from a symbol indicated by S in a slot among the counted K slots, if the slot has no more than L contiguous available symbols starting from a symbol indicated by S.

In an embodiment, a group of N slots starting from the first slot is used by the terminal device in transmitting the TB, each slot of the group other than the first slot having at least 14 available symbols. That is, in case that a slot-based type B TBoMS transmission is configured by the network device, the terminal device counts N slots from the first slot, where any slot other than the first slot having less than 14 available symbols is not counted in counting the N slots. The available symbols of the counted N slots are used by the terminal device in transmitting the TB.

In an embodiment, the configuration further contains a parameter X1 indicating a minimum number of contiguous available symbols in each slot, and wherein a group of N slots starting from the first slot, each slot of the group other than the first slot having no less than X1 contiguous available symbols. That is, in case that a slot-based type B TBoMS transmission is configured by the network device, the terminal device counts N slots from the first slot, where any slot other than the first slot having less than X1 contiguous available symbols is not counted in counting the N slots. The available symbols of the counted N slots are used by the terminal device in transmitting the TB.

In an embodiment, available symbols starting from a symbol indicated by S in any slot previous to the last slot of the group, which slot is not included in the group and has no less than X1 contiguous available symbols, are symbol-wise repetition of symbols in a particular slot of the group. That is, in case that a slot-based type B TBoMS transmission or a type A multi-slot transmission is configured by the network device, the slot that is deemed as an unavailable slot in counting the N slots carries symbol repetition of symbols of a particular slot of the N counted slots.

In an embodiment, available symbols of L symbols starting from the symbol indicated by S are used by the terminal device in transmitting the TB. That is, in case that a symbol-based type B TBoMS transmission is configured by the network device and a parameter L is configured, the terminal device counts L symbols from the first symbol indicated by S, and uses available symbols among the L symbols in transmitting the TB.

In an embodiment, L available symbols starting from the symbol indicated by S are used by the terminal device in transmitting the TB. That is, in case that a symbol-based Type B TBoMS transmission is configured by the network device and a parameter L is configured, the terminal device counts L available symbols from the symbol indicated by S and uses the counted L available symbol in transmitting the TB.

In an embodiment, the configuration further contains a parameter X1 indicating a minimum number of available symbols in each slot, and any slot covered by the L symbols with less than X1 available symbols is not used in transmitting the TB. That is, in case that a symbol-based type B TBoMS transmission is configured by the network device and a parameter L is configured, the terminal device counts L symbols from the first symbol indicated by S, any slot with less than X1 available symbols covered by the L symbols is deemed as an unavailable slot and symbols of the unavailable slot are not used in transmitting the TB. In this case, the terminal device uses at most L symbols in transmit the TB.

In an embodiment, the configuration further contains a parameter X1 indicating a minimum number of available symbols in each slot, and any slot covered by the L available symbols with less than X1 available symbols is not counted for the L available symbols and not used in transmitting the TB. That is, in case that a symbol-based Type B TBoMS transmission is configured by the network device and a parameter L is configured, the terminal device counts L available symbols from the symbol indicated by S, any slot with less than X1 available symbols is not counted in counting the available symbols and deemed as an unavailable slot. That is, symbols of the unavailable slot is not counted in counting the L available symbols and not used in transmitting the TB. The terminal device uses the counted L available symbols in transmitting the TB.

In an embodiment, available symbols in the slot after the first slot, which slot is not used in transmitting the TB are symbol-wise repetition of symbols in a particular slot used in transmitting the TB. That is, in case that a symbol-based type B TBoMS transmission is configured by the network device, the slot that is not used in transmitting the TB carries symbol repetition of symbols of a particular slot used in transmitting the TB.

In an embodiment, the configuration further contains a Physical Uplink Shared Data Channel, PUSCH, mapping type.

In an embodiment, the PUSCH mapping type comprises at least PUSCH mapping type A and PUSCH mapping type B, and the PUSCH mapping type A or the PUSCH mapping type B is configured for the type A TBoMS transmission.

In an embodiment, the terminal device uses the PUSCH mapping type B for any slot having less than L contiguous available symbols used in transmitting the TB when the type A TBoMS transmission is indicated in the configuration.

In an embodiment, the terminal device uses the PUSCH mapping type A for transmitting the TB when the type A TBoMS transmission is indicated in the configuration and any slot used in transmitting the TB has at least four available symbols, wherein a Demodulation Reference Signal, DMRS, position in each slot is defined relative to a parameter S defined in the PUSCH mapping type A.

In an embodiment, the terminal device uses the PUSCH mapping type A for any slot having less than four contiguous available symbols used in transmitting the TB when the type A TBoMS transmission is indicated in the configuration and N slots starting from the first slot are used in transmitting the TB regardless of whether any slot among the N slots has L available symbols or not, and the terminal device uses a separately configured DMRS configuration.

In an embodiment, the PUSCH mapping type B is configured for the type B TBoMS transmission, and a Demodulation Reference Signal, DMRS, position in each slot depends on the number of contiguous available symbols in the slot.

In an embodiment, the parameter L defined in the PUSCH mapping type B for a symbol-based Type B TBoMS transmission is larger than 14 for normal Cyclic Prefix, CP, or 12 for extended CP.

In an embodiment, the configuration further indicates a frequency hopping supported, including one or more of:
    intra-slot frequency hopping,
    inter-slot frequency hopping, or
    inter-bundle frequency hopping.

In an embodiment, the slot used in transmitting the TB forms a predefined number of bundles and each bundle uses a same frequency hopping.

In an embodiment, the configuration further indicates whether the frequency hopping applies for any of the slot used in transmitting the TB with less than a predetermined number of contiguous available symbols.

In an embodiment, if the configuration indicates that a frequency hopping is disabled, the terminal device uses the same set of Physical Resource Blocks (PRBs) across the N slots, and if the configuration indicates that a frequency hopping is enabled, the number of PRBs is the same across the N slots.

In an embodiment, in case that a type A TBoMS transmission or a slot-based type B TBoMS transmission is configured by the network device, the parameter N is indicated with one or more of the following:
    N is signaled by a new Downlink Control Information, DCI, field;
    N is added to a Time Domain Resource Assignment, TDRA, table and jointly encoded with TDRA field in DCI; or
    N is Radio Resource Control, RRC, configured.

In an embodiment, transmission of the TB is scheduled with dynamic grant or configured grant.

In an embodiment, when a dynamic Slot Format Indication, SFI, is configured and the transmission of the TB is scheduled with dynamic grant, dynamic downlink symbols in any slot configured for transmitting the TB are regarded as unavailable symbols.

In an embodiment, when a dynamic SFI is configured and the transmission of the TB is scheduled with configured grant, whether semi-static flexible symbols in any slot configured for transmitting the TB are available symbols is RRC/DCI configured or predetermined.

In an embodiment, when a dynamic SFI is not configured, whether semi-static flexible symbols in any slot configured for transmitting the TB are available symbols is RRC/DCI configured or predetermined.

In an embodiment, a single Cyclic Redundancy Check, CRC, is transmitted for the TB.

Figure 3:
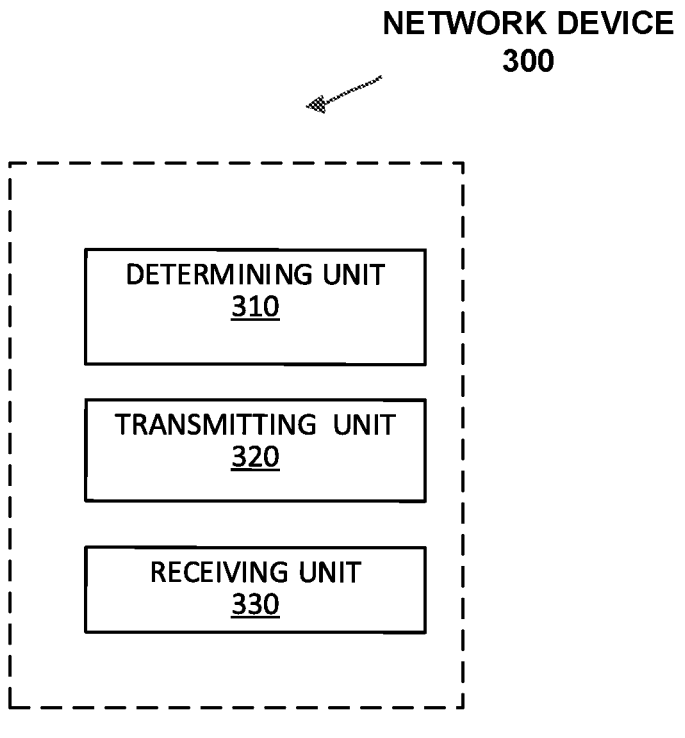
FIG. 3 is a block diagram of a network device according to another embodiment of the present disclosure.

Correspondingly to the method 100 as described above, a network device is provided. FIG. 3 is a block diagram of a network device 300 according to an embodiment of the present disclosure.

As shown in FIG. 3, the network device 300 includes a determining unit 310 configured to determine a configuration for a terminal device to transmit a TB.

The network device 300 further include a transmitting unit 320 configured to transmit the configuration.

The network device 300 may further include a receiving unit 330 configured to receive the TB that is transmitted according to the configuration from the terminal device.

The determining unit 310, transmitting unit 320 and the receiving unit 330 of the network device 300 may be configured to perform the actions discussed with FIG. 1 to implement the function of the network device.

The units 310-330 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
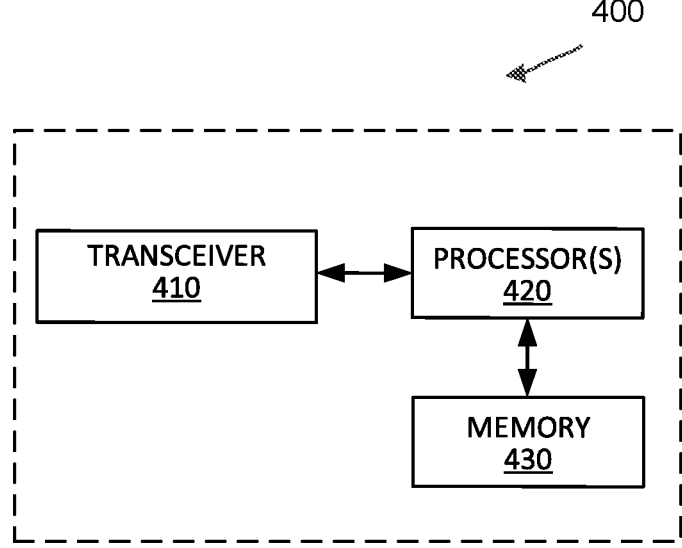
FIG. 4 is a block diagram of a network device according to another embodiment of the present disclosure.

FIG. 4 is a block diagram of a network device 400 according to another embodiment of the present disclosure.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 1.

In an embodiment, the memory 430 contains instructions executable by the processor 420 whereby the network device 400 is operative to determine a configuration for a terminal device to transmit a TB, to transmit the configuration to the terminal device, and to receive the TB that is transmitted from the terminal device according to the configuration.

Figure 5:
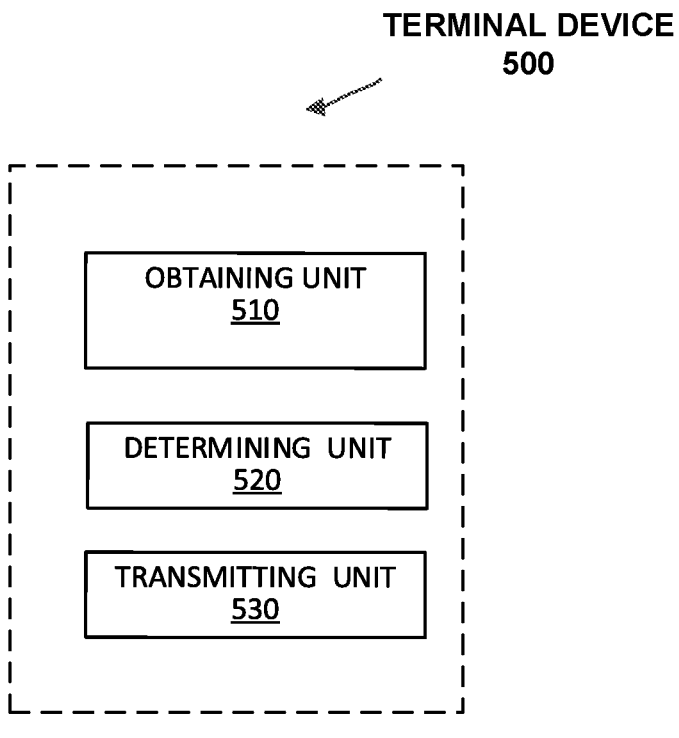
FIG. 5 is a block diagram of a terminal device according to an embodiment of the present disclosure.

Correspondingly to the method 200 as described above, a terminal device is provided. FIG. 5 is a block diagram of a terminal device 500 according to an embodiment of the present disclosure.

As shown in FIG. 5, the terminal device 500 includes an obtaining unit 510 configured to obtain a configuration for transmitting a TB from a network device.

The terminal device 500 may further include a determining unit 520 configured to determine resources for transmitting the TB according to the configuration.

The terminal device 500 may further include a transmitting unit 530 configured to transmit the TB to the network device over the determined resources.

The obtaining unit 510, determining unit 520, and the transmitting unit 530 of the terminal device 500 may be configured to perform the actions discussed with FIG. 2 to implement the function of the terminal device.

The units 510-530 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
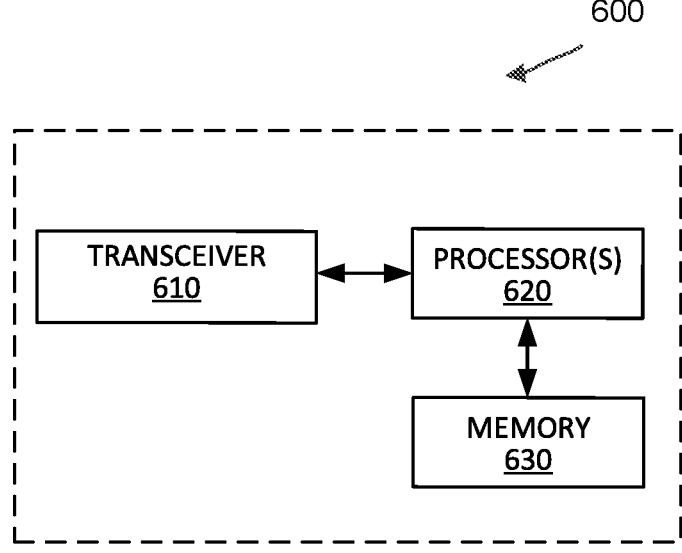
FIG. 6 is a block diagram of a terminal device according to another embodiment of the present disclosure.

FIG. 6 is a block diagram of a terminal device 600 according to another embodiment of the present disclosure.

The terminal device 600 includes a transceiver 610, a processor 620 and a memory 630. The memory 630 contains instructions executable by the processor 620 whereby the terminal device 600 is operative to perform the actions, e.g., of the procedure described earlier in conjunction with FIG. 2.

In an embodiment, the memory 630 contains instructions executable by the processor 620 whereby the terminal device 600 is operative to obtain a configuration for transmitting a TB from a network device, to determine resources for transmitting the TB according to the configuration, and to transmit the TB to the network device over the determined resources.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the network device 400 to perform the actions, e.g., of the procedure described earlier in conjunction with FIG. 1; or code/computer readable instructions, which when executed by the processor 620 causes the terminal device 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or FIG. 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure is not limited to the foregoing embodiments, and may further comprise the following embodiments.

3.1 Outline

PUSCH coverage was identified as one of coverage bottlenecks. In NR Rel-15/16, one UL TB is confined to the UL symbols in a slot. To support high data rate, multiple PRBs in a slot constitute a TB and multiple PRBs share UE transmission power. Transport Block (TB) processing over multiple slots, i.e., TBoMS, was proposed as a candidate solution of coverage enhancement of PUSCH. TBoMS extends a TB across slot border to increase power spectrum density, reduce code rate by reducing CRC overhead in some slots of the TB. The mechanism of TBoMS and related signaling are discussed below.

TBoMS transmission may be based on dynamic grant and/or configured grant. We use term "DG based TBoMS transmission" and the term "CG based TBoMS transmission" respectively.

Here the dynamic grant means a grant provided by L1 signaling or MAC layer e.g. random access response. The configured grant means a grant provided by RRC and/or at least partially provided by a DCI for activating the configuration grant, similar to the CG type 1 and CG type 2 respectively defined in NR release R15 and R16.

Embodiment 1, TBoMS transmission can be scheduled by a dynamic grant and/or a configured grant for PUSCH transmissions.

In some TDD UL/DL configurations, there are a small number of contiguous UL slots in a radio frame. To utilize the time diversity of TBoMS, slots of a TB don't have to be contiguous.

Embodiment 2, multiple slots and symbols of a TB can be contiguous or non-contiguous, within a radio frame or across frame border.

Embodiment 3, if frequency hopping is disabled, UE uses the same set of PRBs across multiple slots of a TB. If frequency hopping is enabled, the number of PRBs is the same across multiple slots of a TB.

Some examples of unavailable symbols are DL symbols, UL symbol in a slot, which is not scheduled for the UE, semi-static flexible symbols which are later configured as DL symbols by dynamic SFI, UCI on PUCCH of higher priority, and RRC/DCI configured invalid symbols. Invalid symbol pattern has been supported for Rel-16 PUSCH repetition type B and it can also be configured for TBoMS transmission.

With different methods on the allocation of a number of UL symbols in multiple slots of a TB, there can be several types of TBoMS transmission. In this invention, the term "Type-A TBoMS transmission" is used for a type of TBoMS which is transmitted using the same UL symbols in each of the multiple slots, while another term "Type-B TBoMS transmission" is used for a type of TBoMS which is transmitted on multiple slots allowing available UL symbols across slots. The time domain resource allocation can be based on slot for both types, namely UL resources in certain number of slots are assigned for the TB. For Type-B TBoMS transmission, symbol-based resource allocation, i.e., resource allocation based on a number of symbols, is also applicable.

Embodiment 4, Type-A TBoMS transmission uses the same UL symbols in each slot of multiple slots of a TB.

In a sub-embodiment of Embodiment 4, UE needs to be configured with S, L and N for Type A TBoMS transmission. S and L are the starting symbol relative to the start of a slot and a number of consecutive symbols in a slot in the set of multiple slots of a TB, respectively. N is a number of slots of a TB.

Embodiment 5, Type-B TBoMS transmission uses all available UL symbols in multiple slots of a TB.

In a sub-embodiment of Embodiment 5, one resource allocation for Type-B TBoMS transmission can be slot-based, by which UE uses all available UL symbols in N slots of a TB. UE needs to be configured with S and N for slot-based Type-B TBoMS transmission. S is the starting symbol in the first slot of multiple slots for the TB. N is the number of slots of a TB. L is pre-determined as 14 and doesn't need to be configured explicitly.

Definition of S, L and N for Type A TBoMS transmission and slot-based Type B TBoMS transmission can be found in Table 3.5-1.

A TDD network configures semi-static TDD pattern by RRC signaling and dynamic slot format by DCI format 2_0 with SFI.

Embodiment 6, one or more of below methods can be applied for TBoMS transmission with regard to semi-static flexible symbols and transmission conflict with dynamic SFI.

if dynamic SFI is not configured,
   UE scheduled with dynamic or configured grant can be RRC/DCI configured or predetermined whether semi-static flexible symbols are available.
   For example, for UE with dynamic grant, semi-static flexible symbols are available.
if dynamic SFI is configured,
   UE with dynamic grant can regard dynamic DL symbols as unavailable.
   UE with configured grant processes TBoMS transmission as if there is no dynamic SFI. If some of the symbols scheduled by configured grant are indicated as DL by dynamic SFI, UE either cancel the transmission in the CBG or the slot or the conflicting symbols.

Embodiment 7, UE capabilities on transmissions over multiple slots for a TB can be one or more of the following:
   Whether frequency hopping is applied across slots
   Whether power allocation is same across slots.
   Whether the slots are consecutive or how large the gap is between any 2 of the slots in the set of multiple slots.
   Phase coherency across the multiple slots
   Type A or Type B, slot-based or symbol-based, Option 1 and Option 2

In a sub-embodiment of embodiment 7, one or more of the above capabilities can depend on one or more of the other above capabilities.

3.2 Type-A TBoMS Transmission and Slot-Based Type-B TBoMS Transmission

For both Type A TBoMS transmission and slot-based Type-B TBoMS transmission, two options can be applied regarding N as physical or available slots.

Embodiment 1, for both Type A TBoMS transmission and slot-based Type-B TBoMS transmission, if N slots are configured for TBoMS transmission and the TBoMS starts from slot n, one or multiple of below methods can be used to determine multiple slots to be used for a TB.

Option 1, the TB ends in slot n+K−1.

Option 2, if a slot has only part of the L scheduled symbols available for the UE, it is not counted. Only slots in which all the L scheduled symbols are available is counted, until N slots are found.

Note: L is not configured for slot-based Type B TBoMS transmission. In option 2 for slot-based Type-B TBoMS transmission, L=14 for the multiple slots other than the first slot. L=14-S for the first slot.

For both Option 1 and 2,
   In a slot from the first slot till the last slot, if only part of the L scheduled symbols are available for the TB, whether the UL symbols in the slot can be used or not can be configured or predetermined in specification.
   UE can be RRC/DCI configured or pre-defined with X1, the minimum number of contiguous UL symbols among the L scheduled symbols in a slot which can be used for the TB. A slot with less than X1 UL symbols is not used for the TB. If X1=1, all UL symbols (whose number is less than L) in the slot can be used. If X1=L, the slots with less than L contiguous symbols are not used. If X1 is not configured, a default value can be predetermined, for example X1=L.

If UE is configured to use the UL symbols in a slot with less than L contiguous symbols for TBoMS transmission, one or more of below ways can be configured:

The UL symbols in the slot carry new information bits and are counted in TBS determination.

The UL symbols in the slot are symbol-wise repetition of the same symbols in previous or subsequent or a particular slot, e.g. the first slot. Namely, transmission in the slot uses the same Redundancy Version (RV) as that slot. These UL symbols are not counted in TBS determination.

Figure 7:
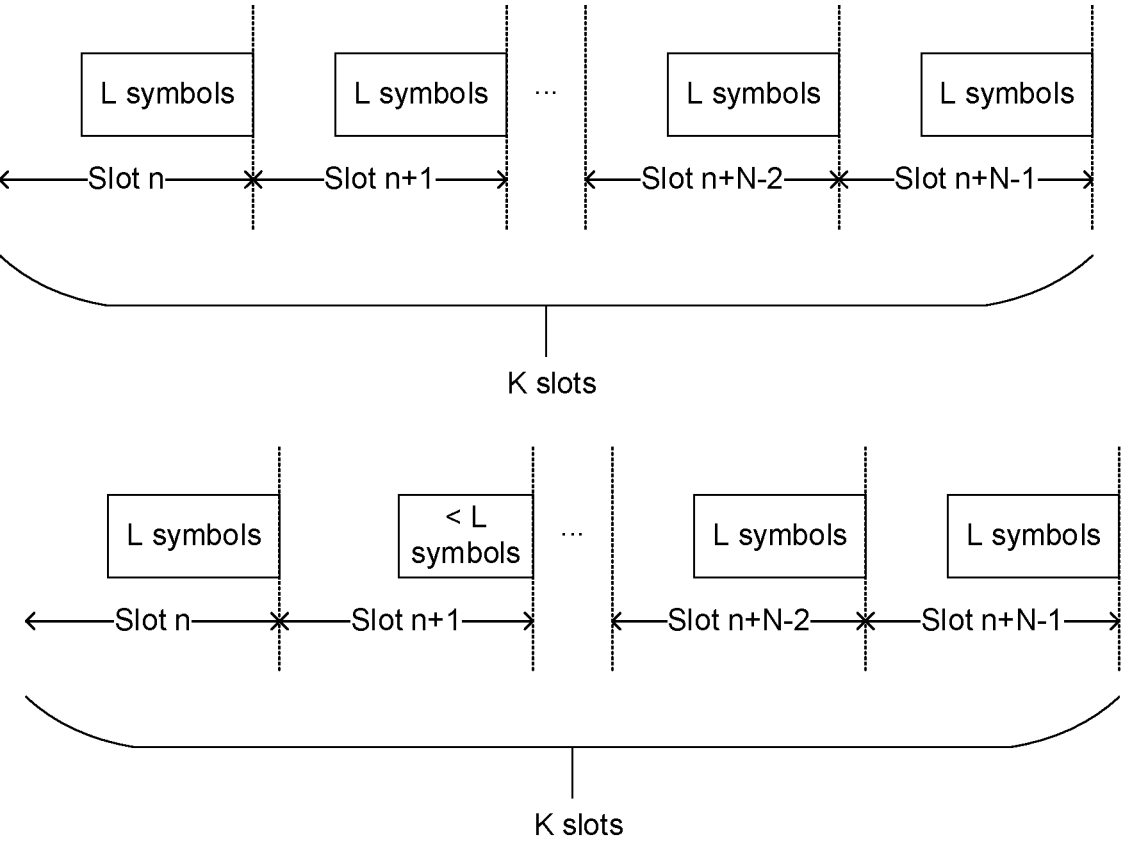
FIG. 7 illustrates an example of a Type-A multi-slot TB transmission according to an embodiment of the present disclosure.

An example of Option 1 of Type-A TBoMS transmission is illustrated in FIG. 7. In the upper part of the figure each slot of slot n~slot n+N−1 has at least L contiguous available symbols and UE uses the same L symbols in each of N slots. The lower part of the figure shows there are less than L contiguous available UL symbols in Slot n+1. With X1=1, UL symbols in Slot n+1 can be used for the TB. UE is configured to transmit the same bits as in the same symbols in previous slot. With option 1, the TB is composed of at most L*N UL symbols.

Figure 8:
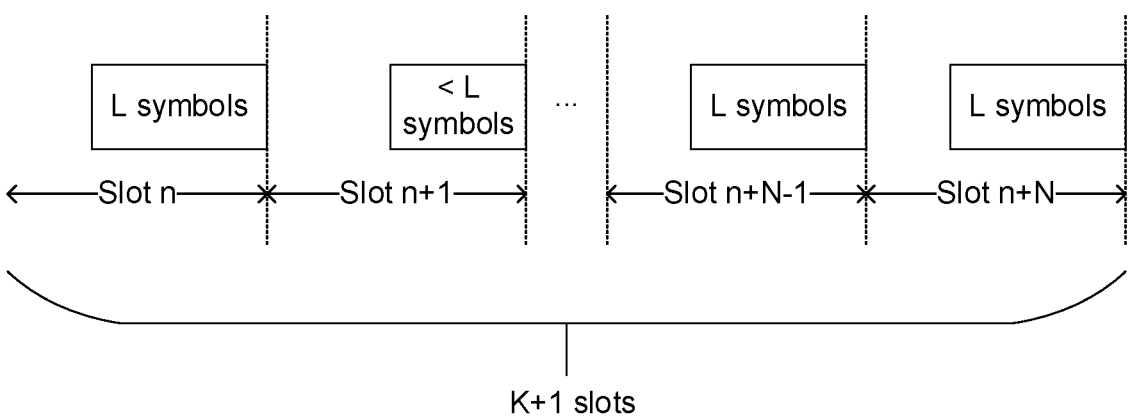
FIG. 8 illustrates another example of a Type-A multi-slot TB transmission according to an embodiment of the present disclosure.

An example of Option 2 of Type-A TBoMS transmission is illustrated in FIG. 8. There are less than L contiguous available UL symbols in slot n+1 and it is not counted as an available slot. With X1=1, UL symbols in Slot n+1 can be used for the TB although Slot n+1 is not counted as an available slot. UE is configured to transmit the same bits in the symbols of Slot n+1 as in the same symbols in a previous slot. The last available slot is postponed till Slot n+K. With option 2, the TB is composed of at least L*N UL symbols.

Figure 9:
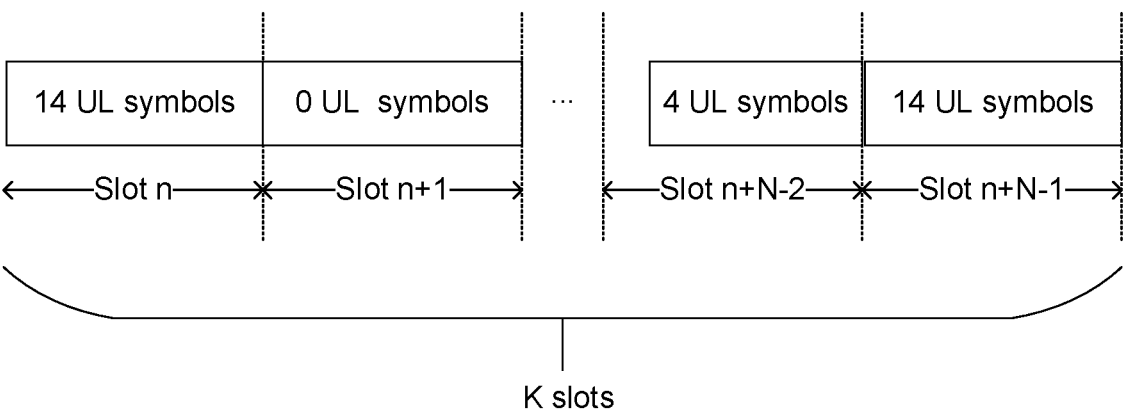
FIG. 9 illustrates an example of a slot-based Type-B multi-slot TB transmission according to an embodiment of the present disclosure.

In TDD configuration DDDSUDDDSU, UE is scheduled with a TBoMS transmission starting from the first UL slot in the radio frame. With Option 1 of slot-based Type-B TBoMS transmission and K=6, the TBoMS transmission will cross 6 slots, namely UDDDSU. With Option 2 and K=2, the TB also spans UDDDSU, until 2 UL slots are found, as illustrated in FIG. 9. There are four UL symbols in the special slot. If X1>4, UL symbols in the special slot are not used.

3.3 Symbol-Based Type-B TBoMS Transmission

Resource allocation for Type-B TBoMS transmission can be slot-based or symbol-based. Slot or symbol is the time-domain scheduling granularity. Slot-based options have a TB that ends at slot boundary; symbol-based options mean gNB schedules a particular number of symbols across multiple slots for a TB. Symbol-based options may have a TB end in the middle of a slot. Slot-based option is configured with N slots, either physical slots or available slots. Symbols-based option uses L symbols, either physical symbols or available symbols.

Embodiment 1, symbol-based Type-B TBoMS transmission spans L symbols in multiple slots of a TB.

Here L symbols are the total number of the UL symbols across the slots scheduled for the TB transmission.

In one sub-embodiment of Embodiment 1, for symbol-based resource allocation, UE needs to be configured with S and L for symbol-based Type-B TBoMS transmission. S is the starting symbol in the first slot of multiple slots for the TB. L is the number of symbols of a TBoMS. N is not configured. One or multiple of below methods can be used to determine the symbols to be used for a TB.

Option 1, the TB spans L symbols and ends after symbol S+L−1.

Option 2, the TB ends after the Lth available UL symbol.

Definition of S and L for symbol-based Type B TBoMS transmission can be also found in Table 3.5-1.

In another sub-embodiment of Embodiment 1, for symbol-based Option 1 and Option 2, if a slot has less than 14 available UL symbols, UE can be RRC/DCI configured or predefined with X1, the minimum number of contiguous UL symbols in a slot to be used. If X1 is not configured, a default value can be predetermined, for example 14.

If UE is configured to use the [X1, 14) UL symbols in a slot for TBoMS other than the first slot, one or more of below ways can be configured.

The UL symbols in the slot carry new information bits and are counted in TBS determination. These symbols are counted as available symbols for Option 2.

The UL symbols in the slot are symbol-wise repetition of the same symbols in a previous or subsequent or a particular slot, e.g. the first slot. Namely, transmission in the slot uses the same RV as that slot. These UL symbols are not counted in TBS determination. These symbols are counted as unavailable symbols for Option 2.

3.4 PUSCH Mapping Type

In Rel-15/16, PUSCH transmission in a slot is configured with PUSCH mapping Type A or B, which relates to valid S and L combinations, DM-RS positions within a slot with intra-slot frequency hopping enabled, etc. PUSCH mapping Type A has at least 4 UL symbols in a slot. PUSCH mapping type A or B also needs to be configured for TBoMS transmission.

Embodiment 1, Type-A TBoMS transmission can be configured with either PUSCH mapping Type A or B. The multiple slots of the TB, which have all the scheduled L symbols available, should conform to the configured PUSCH mapping Type.

In a sub-embodiment of Embodiment 1, if UE is configured to carry new information in the less than L UL symbols in a slot for TBoMS, one or more ways can be applied.

the slot can use Type B of corresponding number of symbols, regardless of the number of UL symbols in the slot.

If the slot has at least 4 contiguous UL symbols, it still uses PUSCH mapping Type A with the exceptions that the reference point for PUSCH length and DMRS position(s) are defined relative to the start of the scheduled PUSCH resources in the slot.

If the slot has less than 4 contiguous UL symbols, DMRS configuration can be separately configured or predefined, for example, the slot has no DMRS in it.

Embodiment 2, Type-B TBoMS transmission and can be configured with PUSCH mapping Type B. DMRS position in each of the multiple slots of the TB depends on number of contiguous UL symbols in the slot.

In a sub-embodiment of Embodiment 2, valid L for PUSCH mapping Type B for symbol-based Type-B TBoMS transmission can be larger than 14 for normal CP and 12 for extended CP.

Embodiment 3, frequency hopping can be supported for TBoMS, including one or more of following options:

intra-slot frequency hopping inter-slot frequency hopping inter-bundle frequency hopping.

Several slots of a TB can form a bundle and uses the same hop.

For example, if a TB across 8 slots is configured with two bundles, the first 4 slots use one hop and the latter 4 slots use another hop.

In a sub-embodiment of Embodiment 3, whether frequency hopping applies for PUSCH transmission in the slot with less than a number of symbols can be configured or predefined.

For one example, PUSCH transmission in a slot with at least a minimum number of OFDM symbols is required for intra-slot frequency hopping. Otherwise intra-slot frequency hopping is not allowed. It is to avoid a hop with too short length.

For another example, if PUSCH mapping type A is configured for TBoMS, a slot with less than 4 contiguous UL symbols is not required for intra-slot frequency hopping.

3.5 Signaling on Time Domain Resources of TBoMS Transmission

Embodiment 1, for TBoMS transmission, UE can be configured with one or more of below parameters by RRC/DCI signaling.

TBoMS transmission Type, Type-A or Type-B resource allocation options

Type A TBoMS transmission, Option 1 or Option 2

The starting symbol in multiple slots, number of contiguous UL symbols in a slot, number of slots for the TB transmission Type B TBoMS transmission, Slot-based, Option 1 or Option 2.

The starting symbol in the first slot, number of slots for the TB transmission

Symbol-based, Option 1 or Option 2.

The starting symbol in the first slot, number of symbols for the TB transmission Option 1 and Option 2 of Type A TBoMS transmission and slot-based Type B TBoMS transmission are defined in Embodiment 1 in section 3.2. Option 1 and Option 2 of symbol-based Type B TBoMS transmission are defined in Embodiment 1 in section 3.3.

The parameters to be configured for each type of TBoMS transmission and the corresponding configuration methods can be summarized in Table 3.5-1. S and L have different meanings in different types of TBoMS transmission and can reuse the configuration method in Rel-15/16. N for Type A TBoMS transmission and slot-based Type B TBoMS transmission needs to be configured.

TABLE 3.5-1

Parameter definition and configuration methods of TBoMS transmission

| | S | L | K |
|---|---|---|---|
| Type A TBoMS transmission | the starting symbol in each slot of multiple slots, configured by existing method | number of contiguous UL symbols in each slot of multiple slots, configured by existing method | number of slots for the TB transmission, by RRC/DCI |
| Slot-based Type B TBoMS transmission | the starting symbol in the first slot, configured by existing method | NA | NA |
| Symbol-based Type B TBoMS transmission | | number of symbols for the TB, configured by existing method | NA |

In one sub-embodiment of Embodiment 1, the number of slots of a TBoMS, N, can be indicated with one or more of below methods.

Alt. 1: N can be signaled by a new DCI field.

Alt. 2: N can be added to the TDRA table and jointly encoded with TDRA field in DCI.

Alt. 3: N can be RRC configured. This can be used for configured grant type 1.

Below it shows an example of Alt. 2.

PUSCH-TimeDomainResourceAllocation information element

```
-- ASN1START
-- TAG-PUSCH-TIMEDOMAINALLOCATIONLIST-START
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::= SEQUENCE {
    k2                              INTEGER(0..32)                    OPTIONAL,
-- Need S
    mappingType                     ENUMERATED {typeA, typeB},
    startSymbolAndLength            INTEGER (0..127)
}
PUSCH-TimeDomainResourceAllocationList-r16 ::= SEQUENCE (SIZE(1..maxNrofUL-Allocations-
r16)) OF PUSCH-TimeDomainResourceAllocation-r16
PUSCH-TimeDomainResourceAllocation-r16 ::= SEQUENCE {
    k2-r16                          INTEGER(0..32)        OPTIONAL,    -- Need S
    puschAllocationList-r16             SEQUENCE (SIZE(1..maxNrofMultiplePUSCHs-r16))
OF PUSCH-Allocation-r16,
    ...
}
```

-continued

| PUSCH-TimeDomainResourceAllocation information element |
|---|

```
PUSCH-Allocation-r16 ::= SEQUENCE {
    mappingType-r16                    ENUMERATED {typeA, typeB}
OPTIONAL,    -- Cond NotFormat01-02-Or-TypeA
    startSymbolAndLength-r16           INTEGER (0..127)
OPTIONAL,    -- Cond NotFormat01-02-Or-TypeA
    startSymbol-r16                    INTEGER (0..13)
OPTIONAL,    -- Cond RepTypeB
    length-r16                         INTEGER (1..14)                 OPTIONAL,
-- Cond RepTypeB
    numberOfRepetitions-r16            ENUMERATED {n1, n2, n3, n4, n7, n8, n12, n16}
OPTIONAL,    -- Cond Format01-02
    slotsperTB                         INTEGER (1,2, ..., maxNrofslotsPerTB)
OPTIONAL
}
-- TAG-PUSCH-TIMEDOMAINALLOCATIONLIST-STOP
-- ASN1STOP
```

In another sub-embodiment of Embodiment 1, valid L for symbol-based Type B TBoMS can be within the rage of $\{1, \ldots,$ maximum symbols of a TBoMS$\}$, where maximum symbols of a TBoMS can be larger than 14 for normal CP and 12 for extended CP, as illustrated in Table 3.5-2.

omitted and/or which symbols are invalid. TBoMS transmission also requires mechanisms to determine time domain resources. Therefore, one way to reduce complexity in UEs that already support PUSCH repetition is to construct a TBoMS transmission by combining PUSCH repetition time TABLE 3.5-2 Valid S and L combinations

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | $\{4, \ldots, 14\}$ | $\{4, \ldots, 14\}$ | 0 | $\{4, \ldots, 12\}$ | $\{4, \ldots, 12\}$ |
| Type B | $\{0, \ldots, 13\}$ | $\{1, \ldots, 14\}$ for PUSCH within one slot, $\{1, \ldots,$ maximum symbols of a TBoMS$\}$ for symbol-based TBoMS | $\{1, \ldots, 14\}$ for repetition Type A, $\{1, \ldots, 27\}$ for repetition Type B, $\{1, \ldots, 13 +$ maximum symbols of a TBoMS$\}$ for symbol-based TBoMS | $\{0, \ldots, 11\}$ | $\{1, \ldots, 12\}$ for PUSCH within one slot, $\{1, \ldots,$ maximum symbols of a TBoMS$\}$ for symbol-based TBoMS | $\{1, \ldots, 12\}$ for repetition Type A, $\{1, \ldots, 23\}$ for repetition Type B, $\{1, \ldots, 11 +$ maximum symbols of a TBoMS$\}$ for symbol-based TBoMS |

3.6 PUSCH Repetition Extended to TBoMS Transmission

Rel-15/16 PUSCH repetition allows multi-slot transmission of a single transport block, including where different redundancy versions of the PUSCH are transmitted in different slots. The multi-slot transport block transmission contemplated by this invention differs from Rel-15/16 PUSCH transmission in that the transport block size is determined based on multiple slots, whereas Rel-15/16 repetition TBS is calculated assuming the entire transport block is carried in each slot. A benefit of determining the TBS of a TBoMS from all slots occupied by the TB is that the TBS grows with the number of slots, and therefore a larger transmission is possible for a given code rate with multi-slot transmission without reducing reliability, and at the same time the avoiding extra overhead of a CRC check in each slot, since there is only one CRC check per TB.

Rel-15/16 repetition comprises a broad set of mechanisms to determine which time domain resources are used. These include how to determine resources allocated to each repetition, the total number of repetitions, and which slots are domain resource determination mechanisms with multi-slot transport block construction methods.

As described above, in rel-15/16, the transport block size is determined according to:

$$N'_{RE} = N^{RB}_{sc} \cdot N^{sh}_{symb} - N^{PRB}_{DMRS} - N^{PRB}_{oh}, \text{ where } N^{sh}_{symb}$$

is the number of symbols of the PUSCH allocation within the slot. This implies that the TBS is proportional to the number of symbols in a slot and that the TBS can't be increased by increasing the number of slots. However, if $$N^{sh}_{symb}$$

is redefined as the number of symbols of the PUSCH allocation in all slots that a given transport block is carried in, then a TBoMS can grow with the number of slots. Additionally, since the TB may not be entirely contained within a single slot of a TBoMS transmission, and since a CRC check of the whole TB requires that the UE receives the entirety of the TB, a single CRC that is used after receiving the entire TB is added to the TB. Because TBoMS transmission is generally motivated by the need for increased coverage of low data rates, it is likely that there is only one TB transmitted in a TBoMS transmission, and adding a CRC for each slot of a multi-slot transmission as is done for Rel-15/16 PUSCH repetition would be likely to increase overhead without improving net performance. Therefore, in some embodiments, a single CRC check is transmitted in a TBoMS transmission.

In some embodiments, PUSCH modulation symbol to RE mapping directly depends on the number of coded bits for the transport block carried by the PUSCH. For example, in 3GPP TS 38.211 V16.3.0, section 6.1.3.6, $$M_{symb}^{ap}$$

modulation symbols $$z^{(p)}(0) \dots z^{(p)}(M_{symb}^{ap} - 1)$$

are mapped to resource elements on antenna port p, where $$M_{symb}^{ap} = M_{symb}^{layer}$$

is the number of modulation symbols per layer, and $$M_{symb}^{layer} = M_{bit}^{(q)}/Q_m, \text{ where } M_{bit}^{(q)}$$

is the number of coded bits in the transport block carried in codeword q of the PUSCH and $Q_m$ is the number of coded bits per modulation symbol. In this case, there is no need to alter the PUSCH modulation symbol to RE mapping when the TBS for TBoMS transmission is determined by redefining $$N_{symb}^{sh}$$

as the number of symbols of the PUSCH allocation in all slots that a given transport block is carried in.

In one embodiment, TBoMS transmission determines time domain resource allocation (TDRA) according to Rel-15/16 PUSCH repetition Type A as defined in 3GPP TS 38.214 V16.3.0. The starting symbol S and the number of consecutive symbols L within each slot are calculated as described in section 6.1.2.1 for repetition type A. In the embodiment, a portion of the TB is carried within each slot, unlike Rel-15 and Rel-16 PUSCH repetition Type A, where the entirety of the TB is encoded within each slot. Because only a portion of the TB is carried, the number of symbols L is less than total number of symbols occupied by the TB in all of the slots that the TB is carried in, $$N_{symb}^{sh}.$$

Also, because S and L are the same for each slot due to this use of PUSCH repetition type A TDRA, the total number of symbols occupied by the PUSCH is then $$N_{symb}^{sh} = K \cdot L.$$

Furthermore, in one such embodiment a slot of a TBoMS is omitted in the same way as for PUSCH repetition type A according to the conditions in Clause 11.1 of 3GPP TS 38.213.

In one embodiment, TBoMS transmission determines time domain resource allocation (TDRA) according to Rel-15/16 PUSCH repetition Type B as defined in 3GPP TS 38.214 V16.3.0. In this embodiment, the TBoMS comprises K segments, each of which is contiguous and L symbols long. The maximum total number of symbols occupied by the PUSCH when all segments are transmitted with L symbols is then $$N_{symb}^{sh} = K \cdot L.$$

The starting symbol S, the number of consecutive symbols L, and the starting and ending slots for each segment are calculated as described in section 6.1.2.1 for repetition Type B, where the starting and ending slots for the n-th segment is calculated in the same way as for the n-th nominal repetition of PUSCH repetition Type B. In some embodiments, the UE determines invalid symbols for TBoMS transmission according to the procedure used for PUSCH repetition type B as given in 3GPP TS 38.214 V16.3.0, section 6.1.2.1. In some embodiments, the UE determines potentially valid symbols for TBoMS transmission and which segments of a multi-slot transmission will be transmitted according to the procedure used for PUSCH repetition type B as given in 3GPP TS 38.214 V16.3.0, section 6.1.2.1, wherein a segment to be transmitted, which may labeled as an 'actual segment', is identified according to the method used to determine an actual transmission. In some embodiments, an actual segment is omitted according to the conditions in Clause 11.1 of 3GPP TS 38.213 V16.3.0.

In a more general embodiment, a UE determines a size of a transport block according to a number of symbols to be occupied by a PUSCH carrying the transport block, where the number of symbols is a number of OFDM symbols occupied by the PUSCH and where the PUSCH occupies a plurality of slots. The UE determines the symbols occupied by the PUSCH according to a PUSCH repetition procedure. In some embodiments, the UE determines whether to transmit the PUSCH in a slot according to PUSCH repetition procedure. The UE then encodes the transport block with an error correction code to form an encoded transport block and transmits the encoded transport block in the PUSCH in the symbols to be occupied within the plurality of slots. In some embodiments, the PUSCH repetition procedure is one of PUSCH repetition Type A or Type B, as defined in 3GPP TS 38.214 V16.3.0. In some embodiments, the number of symbols is determined as $$N_{symb}^{sh} = K \cdot \overline{N}_{symb}^{sh}, \text{ where } \overline{N}_{symb}^{sh}$$

is a number of consecutive OFDM symbols occupied by the PUSCH and K is one of a number of repetitions determined according to a PUSCH repetition procedure and a number of slots that the PUSCH is configured to occupy.

Figure 10:
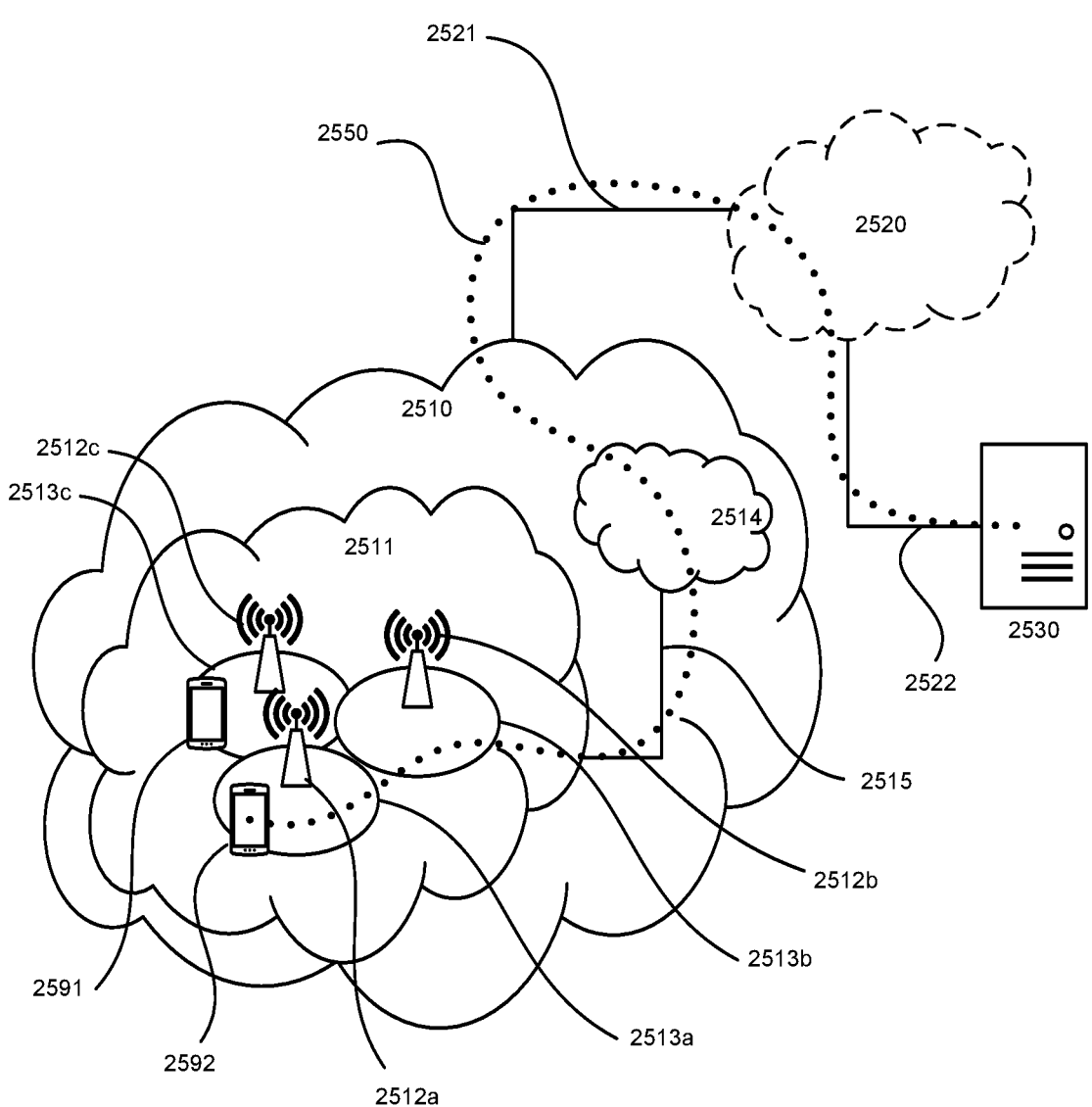
FIG. 10 schematically illustrates a telecommunication network connected via an intermediate network to a host computer.

With reference to FIG. 10, in accordance with an embodiment, a communication system includes a telecommunication network 2510, such as a 3GPP-type cellular network, which comprises an access network 2511, such as a radio access network, and a core network 2514. The access network 2511 comprises a plurality of base stations 2512a, 2512b, 2512c, such as NBs, eNBs, gNBs or other types of wireless access points, each defining a corresponding coverage area 2513a, 2513b, 2513c. Each base station 2512a, 2512b, 2512c is connectable to the core network 2514 over a wired or wireless connection 2515. A first UE 2591 located in a coverage area 2513c is configured to wirelessly connect to, or be paged by, the corresponding base station 2512c. A second UE 2592 in a coverage area 2513a is wirelessly connectable to the corresponding base station 2512a. While a plurality of UEs 2591, 2592 are illustrated in this example, the disclosed embodiments are equally applicable to a situation where a sole UE is in the coverage area or where a sole UE is connecting to the corresponding base station 2512.

The telecommunication network 2510 is itself connected to a host computer 2530, which may be embodied in the hardware and/or software of a standalone server, a cloud-implemented server, a distributed server or as processing resources in a server farm. The host computer 2530 may be under the ownership or control of a service provider, or may be operated by the service provider or on behalf of the service provider. Connections 2521 and 2522 between the telecommunication network 2510 and the host computer 2530 may extend directly from the core network 2514 to the host computer 2530 or may go via an optional intermediate network 2520. An intermediate network 2520 may be one of, or a combination of more than one of, a public, private or hosted network; the intermediate network 2520, if any, may be a backbone network or the Internet; in particular, the intermediate network 2520 may comprise two or more sub-networks (not shown).

The communication system of FIG. 10 as a whole enables connectivity between the connected UEs 2591, 2592 and the host computer 2530. The connectivity may be described as an over-the-top (OTT) connection 2550. The host computer 2530 and the connected UEs 2591, 2592 are configured to communicate data and/or signaling via the OTT connection 2550, using the access network 2511, the core network 2514, any intermediate network 2520 and possible further infrastructure (not shown) as intermediaries. The OTT connection 2550 may be transparent in the sense that the participating communication devices through which the OTT connection 2550 passes are unaware of routing of uplink and downlink communications. For example, the base station 2512 may not or need not be informed about the past routing of an incoming downlink communication with data originating from the host computer 2530 to be forwarded (e.g., handed over) to a connected UE 2591. Similarly, the base station 2512 need not be aware of the future routing of an outgoing uplink communication originating from the UE 2591 towards the host computer 2530.

Example implementations, in accordance with an embodiment, of the UE, base station and host computer discussed in the preceding paragraphs will now be described with reference to FIG. 11. In a communication system 2600, a host computer 2610 comprises hardware 2615 including a communication interface 2616 configured to set up and maintain a wired or wireless connection with an interface of a different communication device of the communication system 2600. The host computer 2610 further comprises a processing circuitry 2618, which may have storage and/or processing capabilities. In particular, the processing circuitry 2618 may comprise one or more programmable processors, application-specific integrated circuits, field programmable gate arrays or combinations of these (not shown) adapted to execute instructions. The host computer 2610 further comprises software 2611, which is stored in or accessible by the host computer 2610 and executable by the processing circuitry 2618. The software 2611 includes a host application 2612. The host application 2612 may be operable to provide a service to a remote user, such as UE 2630 connecting via an OTT connection 2650 terminating at the UE 2630 and the host computer 2610. In providing the service to the remote user, the host application 2612 may provide user data which is transmitted using the OTT connection 2650.

The communication system 2600 further includes a base station 2620 provided in a telecommunication system and comprising hardware 2625 enabling it to communicate with the host computer 2610 and with the UE 2630. The hardware 2625 may include a communication interface 2626 for setting up and maintaining a wired or wireless connection with an interface of a different communication device of the communication system 2600, as well as a radio interface 2627 for setting up and maintaining at least a wireless connection 2670 with the UE 2630 located in a coverage area (not shown in FIG. 11) served by the base station 2620. The communication interface 2626 may be configured to facilitate a connection 2660 to the host computer 2610. The connection 2660 may be direct or it may pass through a core network (not shown in FIG. 11) of the telecommunication system and/or through one or more intermediate networks outside the telecommunication system. In the embodiment shown, the hardware 2625 of the base station 2620 further includes a processing circuitry 2628, which may comprise one or more programmable processors, application-specific integrated circuits, field programmable gate arrays or combinations of these (not shown) adapted to execute instructions. The base station 2620 further has software 2621 stored internally or accessible via an external connection.

The communication system 2600 further includes the UE 2630 already referred to. Its hardware 2635 may include a radio interface 2637 configured to set up and maintain a wireless connection 2670 with a base station serving a coverage area in which the UE 2630 is currently located. The hardware 2635 of the UE 2630 further includes a processing circuitry 2638, which may comprise one or more programmable processors, application-specific integrated circuits, field programmable gate arrays or combinations of these (not shown) adapted to execute instructions. The UE 2630 further comprises software 2631, which is stored in or accessible by the UE 2630 and executable by the processing circuitry 2638. The software 2631 includes a client application 2632. The client application 2632 may be operable to provide a service to a human or non-human user via the UE 2630, with the support of the host computer 2610. In the host computer 2610, an executing host application 2612 may communicate with the executing client application 2632 via the OTT connection 2650 terminating at the UE 2630 and the host computer 2610. In providing the service to the user, the client application 2632 may receive request data from the host application 2612 and provide user data in response to the request data. The OTT connection 2650 may transfer both the request data and the user data. The client application 2632 may interact with the user to generate the user data that it provides.

Figure 11:
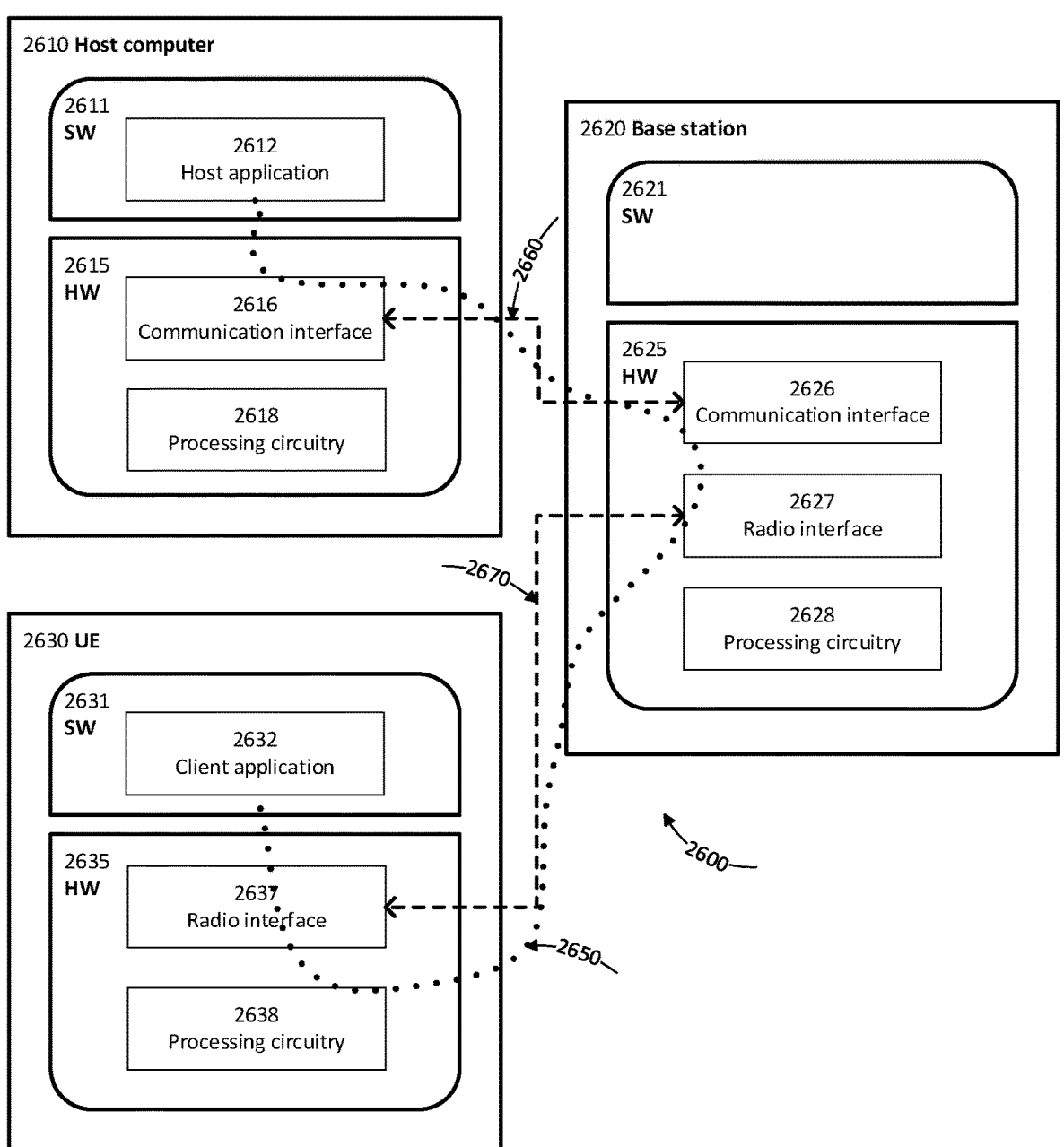
FIG. 11 is a generalized block diagram of a host computer communicating via a base station with a user equipment over a partially wireless connection.

It is noted that the host computer 2610, the base station 2620 and the UE 2630 illustrated in FIG. 11 may be similar or identical to the host computer 2530, one of base stations 2512a, 2512b, 2512c and one of UEs 2591, 2592 of FIG. 10, respectively. This is to say, the inner workings of these entities may be as shown in FIG. 11 and independently, the surrounding network topology may be that of FIG. 10.

In FIG. 11, the OTT connection 2650 has been drawn abstractly to illustrate the communication between the host computer 2610 and the UE 2630 via the base station 2620, without explicit reference to any intermediary devices and the precise routing of messages via these devices. Network infrastructure may determine the routing, which it may be configured to hide from the UE 2630 or from the service provider operating the host computer 2610, or both. While the OTT connection 2650 is active, the network infrastructure may further take decisions by which it dynamically changes the routing (e.g., on the basis of load balancing consideration or reconfiguration of the network).

Wireless connection 2670 between the UE 2630 and the base station 2620 is in accordance with the teachings of the embodiments described throughout this disclosure. One or more of the various embodiments improve the performance of OTT services provided to the UE 2630 using the OTT connection 2650, in which the wireless connection 2670 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 2650 between the host computer 2610 and the UE 2630, in response to variations in the measurement results. The measurement procedure and/or the network functionality for reconfiguring the OTT connection 2650 may be implemented in software 2611 and hardware 2615 of the host computer 2610 or in software 2631 and hardware 2635 of the UE 2630, or both. In embodiments, sensors (not shown) may be deployed in or in association with communication devices through which the OTT connection 2650 passes; the sensors may participate in the measurement procedure by supplying values of the monitored quantities exemplified above, or supplying values of other physical quantities from which the software 2611, 2631 may compute or estimate the monitored quantities. The reconfiguring of the OTT connection 2650 may include message format, retransmission settings, preferred routing etc.; the reconfiguring need not affect the base station 2620, and it may be unknown or imperceptible to the base station 2620. Such procedures and functionalities may be known and practiced in the art. In certain embodiments, measurements may involve proprietary UE signaling facilitating the host computer 2610's measurements of throughput, propagation times, latency and the like. The measurements may be implemented in that the software 2611 and 2631 causes messages to be transmitted, in particular empty or 'dummy' messages, using the OTT connection 2650 while it monitors propagation times, errors etc.

Figures 12, 13:
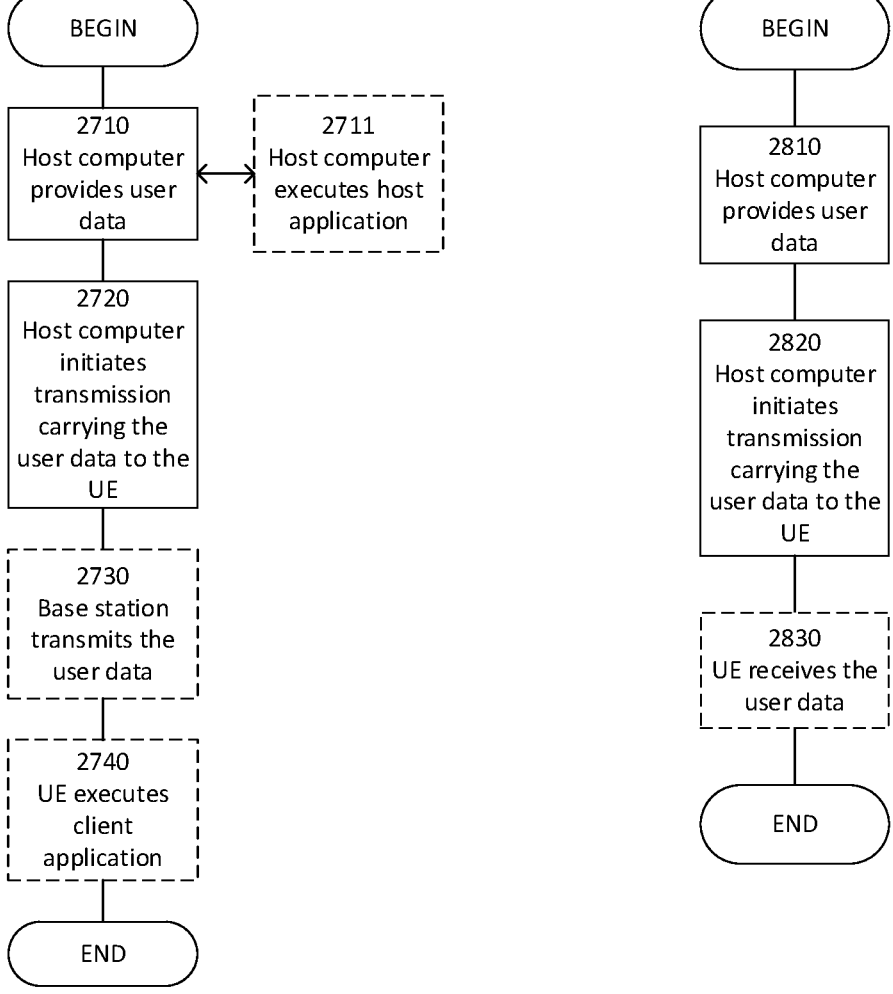
FIGS. 12 to 15 are flowcharts illustrating methods implemented in a communication system including a host computer, a base station and a user equipment.

FIG. 12 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 12 will be included in this section. In step 2710, the host computer provides user data. In substep 2711 (which may be optional) of step 2710, the host computer provides the user data by executing a host application. In step 2720, the host computer initiates a transmission carrying the user data to the UE. In step 2730 (which may be optional), the base station transmits to the UE the user data which was carried in the transmission that the host computer initiated, in accordance with the teachings of the embodiments described throughout this disclosure. In step 2740 (which may also be optional), the UE executes a client application associated with the host application executed by the host computer.

FIG. 13 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 13 will be included in this section. In step 2810 of the method, the host computer provides user data. In an optional substep (not shown) the host computer provides the user data by executing a host application. In step 2820, the host computer initiates a transmission carrying the user data to the UE. The transmission may pass via the base station, in accordance with the teachings of the embodiments described throughout this disclosure. In step 2830 (which may be optional), the UE receives the user data carried in the transmission.

Figures 14, 15:
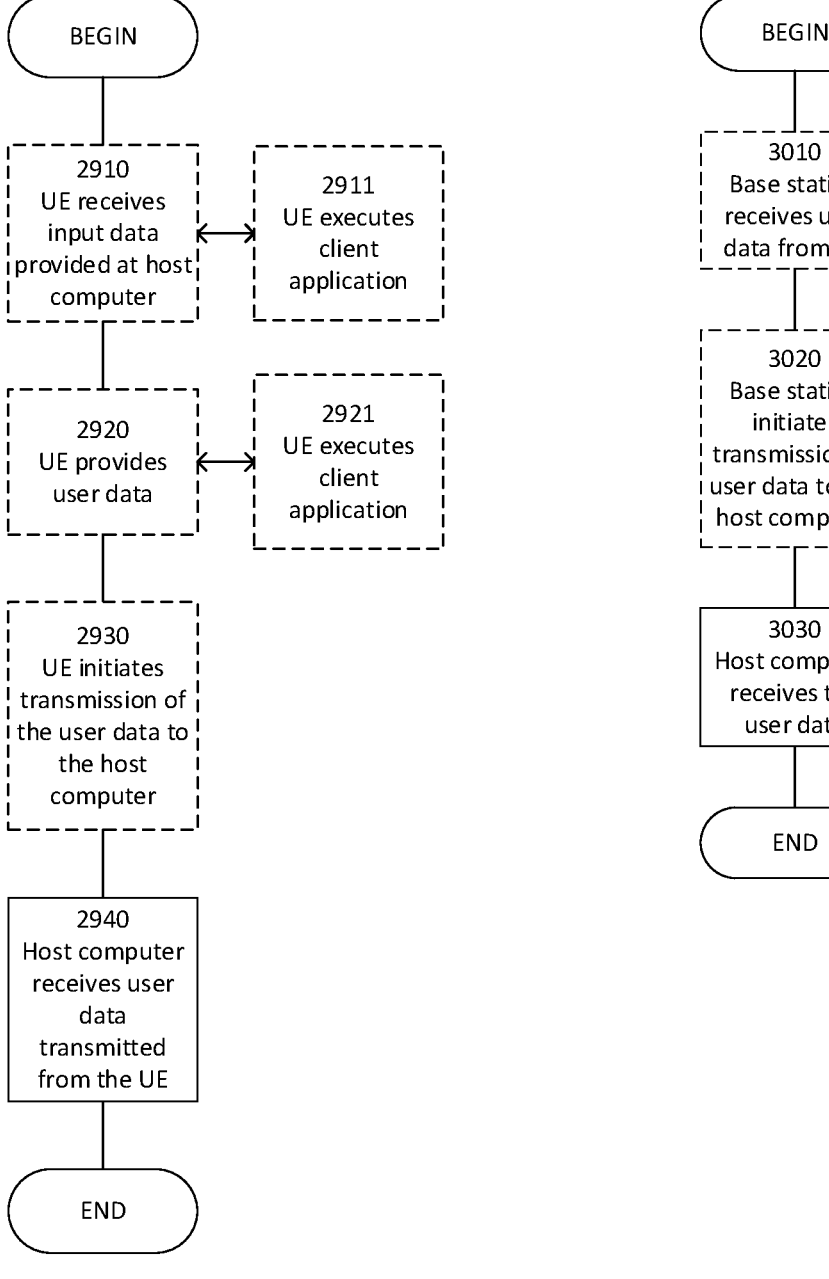

FIG. 14 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 14 will be included in this section. In step 2910 (which may be optional), the UE receives input data provided by the host computer. Additionally or alternatively, in step 2920, the UE provides user data. In substep 2921 (which may be optional) of step 2920, the UE provides the user data by executing a client application. In substep 2911 (which may be optional) of step 2910, the UE executes a client application which provides the user data in reaction to the received input data provided by the host computer. In providing the user data, the executed client application may further consider user input received from the user. Regardless of the specific manner in which the user data was provided, the UE initiates, in substep 2930 (which may be optional), transmission of the user data to the host computer. In step 2940 of the method, the host computer receives the user data transmitted from the UE, in accordance with the teachings of the embodiments described throughout this disclosure.

FIG. 15 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 15 will be included in this section. In step 3010 (which may be optional), in accordance with the teachings of the embodiments described throughout this disclosure, the base station receives user data from the UE. In step 3020 (which may be optional), the base station initiates transmission of the received user data to the host computer. In step 3030 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device, the method comprising:
determining a configuration for a terminal device to transmit a Transmission Block, TB, the configuration indicating at least a transmission mode in which a single TB is allowed to be transmitted over more than one slot, the configuration containing parameters S and L, S indicating a starting symbol relative to a start of a first slot, L indicating a number of contiguous symbols in each slot, the configuration further comprising a parameter X1 indicating a minimum number of contiguous available symbols starting from a symbol indicated by S in each slot, and available symbols in any slot previous to the last slot of a group of N slots, which is not included in the group and has no less than X1 contiguous available symbols starting from a symbol indicated by S, being used by the terminal device in transmitting the TB;
transmitting the configuration to the terminal device; and
receiving the TB that is transmitted from the terminal device according to the configuration, the group of N slots starting from a first slot being used by the terminal device in transmitting the TB, each slot of the group having at least L contiguous available symbols starting from a symbol indicated by S, and L contiguous available symbols starting from a symbol indicated by S in each slot of the group being used by the terminal device in transmitting the TB.

2. The method of claim 1, wherein the configuration indicates a type A TB over Multiple Slots (TBoMS) transmission, and wherein symbols at a same position in each of a number of slots are configured for transmitting the TB.

3. The method of claim 2, wherein the configuration contains parameters N when the type A TBoMS transmission is indicated in the configuration, and N indicates a number of slots.

4. The method of claim 1, wherein available symbols starting from a symbol indicated by S in any slot previous to the last slot of the group, which is not included in the group and has no less than X1 contiguous available symbols, are symbol-wise repetition of symbols in a particular slot of the group.

5. The method of claim 3, wherein the parameter N is indicated with one or more of the following:
N is signaled by a new Downlink Control Information, DCI, field;
N is added to a Time Domain Resource Assignment, TDRA, table and jointly encoded with TDRA field in DCI; or
N is Radio Resource Control, RRC, configured.

6. The method of claim 1, wherein transmission of the TB is scheduled with dynamic grant or configured grant.

7. The method of claim 1, where when a dynamic SFI is not configured, whether semi-static flexible symbols in any slot configured for transmitting the TB are available symbols is Radio Resource Control/Downlink Control Information (RRC/DCI) configured or predetermined.

8. A method in a terminal device, the method comprising:
obtaining a configuration for transmitting a Transmission Block, TB, from a network device, the configuration indicating at least a transmission mode in which a single TB is allowed to be transmitted over more than one slot, the configuration containing parameters S and L, S indicating a starting symbol relative to a start of a first slot, L indicating a number of contiguous symbols in each slot, the configuration further comprising a parameter X1 indicating a minimum number of contiguous available symbols starting from a symbol indicated by S in each slot, and available symbols in any slot previous to the last slot of a group of N slots, which is not included in the group and has no less than X1 contiguous available symbols starting from a symbol indicated by S, being used by the terminal device in transmitting the TB;
determining resources for transmitting the TB according to the configuration; and
transmitting the TB to the network device over the determined resources, the group of N slots starting from a first slot being used by the terminal device in transmitting the TB, each slot of the group having at least L contiguous available symbols starting from a symbol indicated by S, and L contiguous available symbols starting from a symbol indicated by S in each slot of the group being used by the terminal device in transmitting the TB.

9. The method of claim 8, wherein the configuration indicates a type A TB over Multiple Slots (TBoMS) transmission, and wherein symbols at a same position in each of a number of slots are configured for transmitting the TB.

10. The method of claim 9, wherein the configuration contains parameter N when the type A TBoMS transmission is indicated in the configuration, N indicates a number of slots.

11. The method of claim 8, wherein available symbols starting from a symbol indicated by S in any slot previous to the last slot of the group, which is not included in the group and has no less than X1 contiguous available symbols, are symbol-wise repetition of symbols in a particular slot of the group.

12. The method of claim 10, wherein the parameter N is indicated with one or more of the following:
N is signaled by a new Downlink Control Information, DCI, field;
N is added to a Time Domain Resource Assignment, TDRA, table and jointly encoded with TDRA field in DCI; or
N is Radio Resource Control, RRC, configured.

13. The method of claim 8, wherein transmission of the TB is scheduled with dynamic grant or configured grant.

14. The method of claim 8, wherein when a dynamic SFI is configured and the transmission of the TB is scheduled with configured grant, whether semi-static flexible symbols in any slot configured for transmitting the TB are available symbols is Radio Resource Control/Downlink Control Information (RRC/DCI) configured or predetermined.

15. A network device, comprising a transceiver, a processor and a memory, the memory comprising instructions executable by the processor whereby the network device is operative to:
determine a configuration for a terminal device to transmit a Transmission Block, TB, the configuration indicating at least a transmission mode in which a single TB is allowed to be transmitted over more than one slot, the configuration containing parameters S and L, S indicating a starting symbol relative to a start of a first slot, L indicating a number of contiguous symbols in each slot, the configuration further comprising a parameter X1 indicating a minimum number of contiguous available symbols starting from a symbol indicated by S in each slot, and available symbols in any slot previous to the last slot of a group of N slots, which is not included in the group and has no less than X1 contiguous available symbols starting from a symbol indicated by S, being used by the terminal device in transmitting the TB;

transmit the configuration to the terminal device; and receive the TB that is transmitted from the terminal device according to the configuration, the group of N slots starting from a first slot being used by the terminal device in transmitting the TB, each slot of the group having at least L contiguous available symbols starting from a symbol indicated by S, and L contiguous available symbols starting from a symbol indicated by S in each slot of the group being used by the terminal device in transmitting the TB.

16. A terminal device, comprising a transceiver, a processor and a memory, the memory comprising instructions executable by the processor whereby the terminal device is operative to:

obtain a configuration for transmitting a Transmission Block, TB, from a network device, the configuration indicating at least a transmission mode in which a single TB is allowed to be transmitted over more than one slot, the configuration containing parameters S and L, S indicating a starting symbol relative to a start of a first slot, L indicating a number of contiguous symbols in each slot, the configuration further comprising a parameter X1 indicating a minimum number of contiguous available symbols starting from a symbol indicated by S in each slot, and available symbols in any slot previous to the last slot of a group of N slots, which is not included in the group and has no less than X1 contiguous available symbols starting from a symbol indicated by S, being used by the terminal device in transmitting the TB;

determining resources for transmitting the TB according to the configuration; and transmitting the TB to the network device over the determined resources, the group of N slots starting from a first slot being used by the terminal device in transmitting the TB, each slot of the group having at least L contiguous available symbols starting from a symbol indicated by S, and L contiguous available symbols starting from a symbol indicated by S in each slot of the group being used by the terminal device in transmitting the TB.

* * * * *